(12) United States Patent
Xiao

(10) Patent No.: US 11,218,786 B2
(45) Date of Patent: Jan. 4, 2022

(54) SPECTRUM ALLOCATION METHOD AND DEVICE FOR OPTICAL NETWORK AND COMPUTER STORAGE MEDIUM

(71) Applicant: ZTE CORPORATION, Guangdong (CN)

(72) Inventor: Shuchao Xiao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/259,256

(22) PCT Filed: Jul. 1, 2019

(86) PCT No.: PCT/CN2019/094144
§ 371 (c)(1),
(2) Date: Jan. 11, 2021

(87) PCT Pub. No.: WO2020/011041
PCT Pub. Date: Jan. 16, 2020

(65) Prior Publication Data
US 2021/0274272 A1    Sep. 2, 2021

(30) Foreign Application Priority Data

Jul. 10, 2018  (CN) .......................... 201810753226.7

(51) Int. Cl.
*H04Q 11/02* (2006.01)
*H04Q 11/00* (2006.01)

(52) U.S. Cl.
CPC . *H04Q 11/0062* (2013.01); *H04Q 2011/0073* (2013.01); *H04Q 2011/0086* (2013.01)

(58) Field of Classification Search
CPC ............................ H04J 14/0241; H04Q 11/02
See application file for complete search history.

(56) References Cited

U.S. PATENT DOCUMENTS

2012/0201541 A1* 8/2012 Patel ................... H04J 14/0212
398/58

OTHER PUBLICATIONS

Fujii et al., "On-Demand Routing and Spectrum Allocation for Energy-Efficient AoD Nodes in SDM-EONs", J. Opt. Commun. Netw. vol. 9, No. 11, OSA, Nov. 2017 (Year: 2017).*
Ding, Hui, Research on Routing, Resource Allocation and Scheduling in Intelligent Optical Networks, Electronic Technology & Information Science, China Doctoral Dissertations Full-Text Database, Apr. 15, 2015, Section 2.3.
International search report of PCT Patent Application No. PCT/CN2019/094144 dated Sep. 10, 2019.

* cited by examiner

*Primary Examiner* — Shi K Li

(57) ABSTRACT

Disclosed are a spectrum allocation method and device for an optical network and a computer storage medium. The method comprises: segmenting a service path of an optical network to obtain at least one path segment; trying to allocate, in sequence, for each path segment of the service path a service processing manner that satisfies a service spectrum requirement; and when the service processing manner satisfies the service spectrum requirement, allocating a frequency used by each path segment on the service path according to the currently allocated service processing manner of each path segment of the service path.

14 Claims, 10 Drawing Sheets

S1: Segment a service path of an optical network to obtain at least one path segment, a front half segment and a rear half segment of each path segment being respectively located at two adjacent nodes of the service path S2: Try to allocate, in sequence, for each path segment of the service path a service processing manner that satisfies a service spectrum requirement in an order of path segments of the service path from front to rear S3: Allocate, when a currently allocated service processing manner of each path segment of the service path satisfies the service spectrum requirement, a frequency used by each path segment on the service path according to the currently allocated service processing manner of each path segment of the service path

1

SPECTRUM ALLOCATION METHOD AND DEVICE FOR OPTICAL NETWORK AND COMPUTER STORAGE MEDIUM

CROSS-REFERENCE TO RELATED APPLICATIONS

This application claims the priority of Chinese patent application CN 2018107553226.7, entitled "Spectrum Allocation Method and Device for Optical Network and Computer Storage Medium" and filed on Jul. 10, 2018, the entirety of which is incorporated herein by reference.

FIELD OF THE INVENTION

The present disclosure relates to, but is not limited to, transmission technologies for an optical network, and in particular, to a spectrum allocation method for an optical network, a spectrum allocation device for an optical network, and a computer storage medium.

BACKGROUND OF THE INVENTION

In an automatically switched optical network (ASON), for establishment of a label switched path (LSP) of a service, it is required to perform a calculation by using a path calculation method (i.e., constraint-based shortest path first, CSPF) based on existing network topology resources. After a path calculation is completed, it is further required to allocate spectrum (or wavelength) resources for router hops on the path. Herein, an available spectrum range for an optical transport network (OTN) is 191.275-196.075 THz, 4.8 THz in total.

FIG. 1 is a schematic diagram of an internal structure of a node for an optical network according to an embodiment of the present disclosure. As shown in FIG. 1, a direction from a port 1 to a port 2 is called a path direction, and a direction from the port 2 to the port 1 is called a reverse direction. In FIG. 1, Oep1, Oep2, Oep3, and Oep4 respectively indicate four different optical and electric processors (OEPs). The OEPs are used for converting between an optical signal and an electric signal. There are two internal paths from the port 1 to the port 2. Herein, a first path goes directly from a wavelength $\lambda_i$ of the port 1 to a wavelength $\lambda_i$ of the port 2, with the wavelength being constant, and is called a through path; and a second path goes from the wavelength $\lambda_i$ of the port 1 to the Oep1 on an electrical cross-connection subrack, is switched to the Oep4 through the electrical cross-connection subrack, and then goes to the wavelength $\lambda_j$ of the port 2.

In a wavelength division multiplexing (WDM) network with constant bandwidth granularity, each wavelength corresponds to one spectrum, and a center frequency corresponding to each wavelength and a spectrum width occupied by each wavelength are constant. Therefore, wavelengths can be numbered first before performing spectrum allocation. For example, wavelengths can be numbered as: $\lambda_1 \sim \lambda_{192}$. At present, spectra can be allocated through matrix operations in the WDM network. For each node, an internal connectivity matrix is constructed to indicate connectivity between an ingress port wavelength and an egress port wavelength, with 0 indicating connection and 1 indicating disconnection. Specifically, a matrix operation $\Delta$ is defined, $$A \Delta B = ABij = \underset{r=1}{\overset{n}{\mathrm{Min}}}(a_{ir} \mid b_{rj})$$

where A and B indicates two matrixes, ABij indicates a matrix operation result, $a_{ir}$ and $b_{rj}$ respectively indicates elements in the matrixes.

Supposing the number of nodes on a service path is M, each node having an internal connectivity matrix, internal connectivity matrixes of M nodes being respectively expressed as $A_1$ to $A_m$, a $\Delta$ operation for M matrixes is $A_1 \Delta A_2 \Delta \ldots \Delta A_M$. In this way, connectivity between an ingress port wavelength set of a first node and an egress port wavelength set of a last node may be calculated. In a final operation result matrix, each 0 element represents a wavelength allocation sequence, i.e., a feasible wavelength allocation manner.

However, in an elastic optical network, it is required to select different modulation levels and dynamically allocate different frequency slot numbers according to service signal types. In other words, the number of wavelengths required by respective services and spectral widths represented by the wavelengths are changing. Therefore, the wavelengths cannot be numbered according to serial numbers of frequencies. Besides, the matrix method itself is complicated, and constructing a matrix and performing the A operation will consume a longer time.

SUMMARY OF THE INVENTION

Embodiments of the present disclosure provide a spectrum allocation method for an optical network, a spectrum allocation device for an optical network, and a computer storage medium, which can solve a problem that wavelengths cannot be numbered and a problem that a matrix method consumes long time when spectrum allocation is performed for an elastic optical network.

Thus, the present disclosure provides for various embodiments as follows.

In an embodiment of the present disclosure, it is provided a spectrum allocation method for an optical network. The method includes steps of:

segmenting a service path of an optical network to obtain at least one path segment, a front half segment and a rear half segment of each path segment being respectively located at two adjacent nodes of the service path;

trying to allocate, in sequence, for each path segment of the service path a service processing manner that satisfies a service spectrum requirement in an order of path segments of the service path from front to rear; and allocating, when a currently allocated service processing manner of each path segment of the service path satisfies the service spectrum requirement, a frequency used by each path segment on the service path according to the currently allocated service processing manner of each path segment of the service path.

In a further embodiment of the present disclosure, it is provided a spectrum allocation device for an optical network. The device includes a processor and a memory configured to store computer programs that are executable by the processor. Herein, the processor is configured to execute the computer programs to implement steps of any of the above spectrum allocation methods for an optical network.

In a yet further embodiment of the present disclosure, it is provided a computer storage medium, which stores computer programs thereon that, when executed by a processor, implement steps of any of the above spectrum allocation methods for an optical network.

In the spectrum allocation method for an optical network, the spectrum allocation device for an optical network, and the computer storage medium provided in embodiments of the present disclosure, first, a service path of an optical network is segmented to obtain at least one path segment, a front half segment and a rear half segment of each path segment being respectively located at two adjacent nodes of the service path; then, it is tried to allocate, in sequence, for each path segment of the service path a service processing manner that satisfies a service spectrum requirement in an order of path segments of the service path from front to rear; and finally, when a currently allocated service processing manner of each path segment of the service path satisfies the service spectrum requirement, a frequency used by each path segment on the service path is allocated according to the currently allocated service processing manner of each path segment of the service path. As can be seen, the embodiments of the present disclosure do not need to discretize a frequency set and then perform numbering in advance and do not need to perform spectrum allocation through a matrix operation, so that time for performing spectrum allocation in an optical network can be shortened, which improves efficiency of performing spectrum allocation.

DETAILED DESCRIPTION OF THE EMBODIMENTS

The present disclosure is further described in detail below with reference to the accompanying drawings in conjunction of embodiments. It should be understood that the specific embodiments described herein are only used for explaining the present disclosure, rather than limiting the present disclosure.

Embodiment One

The present embodiment may realize spectrum allocation in an optical network. Herein, the optical network may be an elastic optical network or other optical networks.

Figure 1:
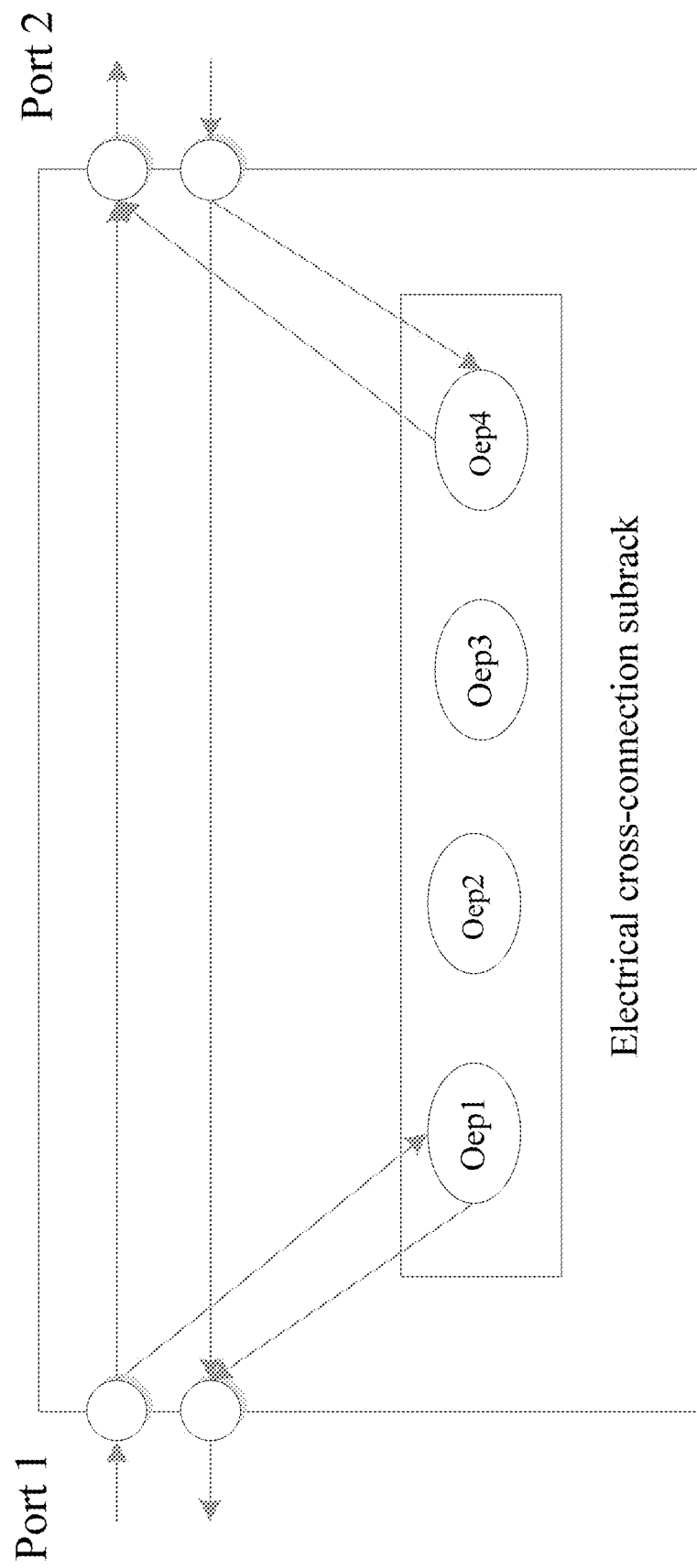
FIG. 1 is a schematic diagram of an internal structure of a node for an optical network according to an embodiment of the present disclosure.
Figure 2:
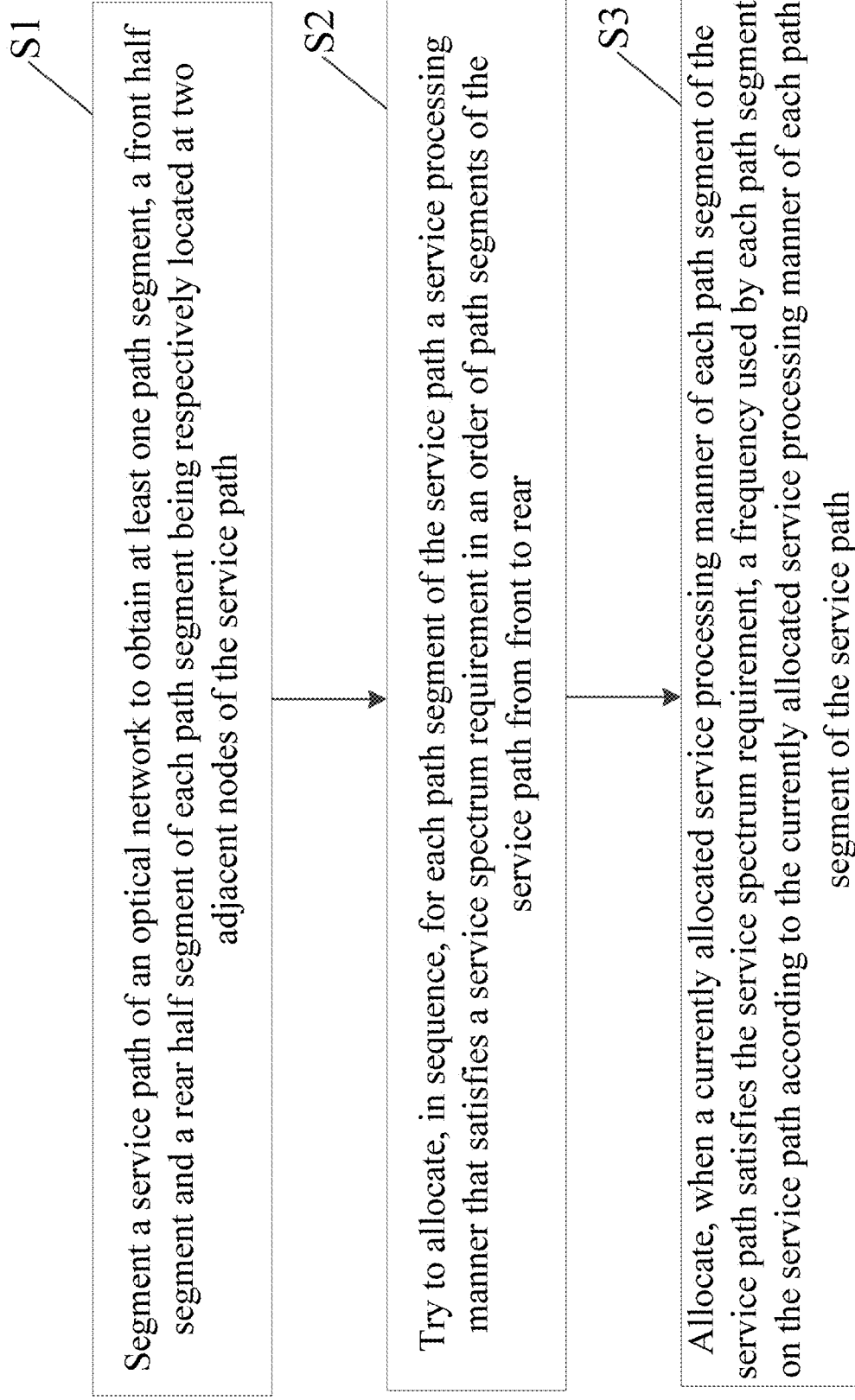
FIG. 2 is a first flowchart of a spectrum allocation method for an optical network according to an embodiment of the present disclosure.

The present disclosure describes, in Embodiment One, a spectrum allocation method for an optical network. FIG. 2 is a first flowchart of the spectrum allocation method for an optical network according to the present embodiment. As shown in FIG. 2, this process may include step S1 to step S3.

At step S1, a service path of an optical network is segmented to obtain at least one path segment, a front half segment and a rear half segment of each path segment being respectively located at two adjacent nodes of the service path.

Figure 3:
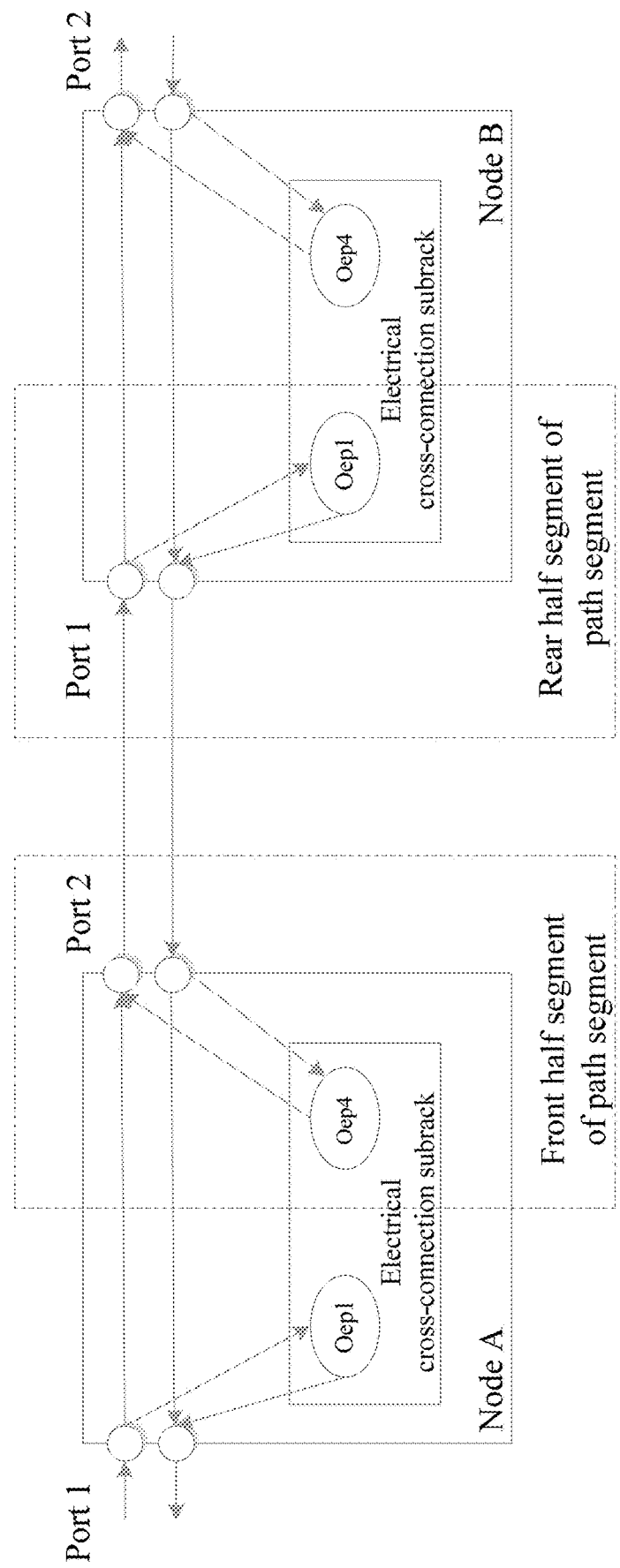
FIG. 3 is a schematic diagram of a structure of a path segment according to an embodiment of the present disclosure.

Herein, the service path of the optical network includes at least one node. Each node has two ports in total, and each of the ports is a router half-hop port. Each node may have at least one electrical cross-connection subrack, and the electrical cross-connection subrack includes multiple OEPs. Frequencies allocated in each path segment are consistent. FIG. 3 is a schematic diagram of a structure of a path segment according to the present embodiment. In FIG. 3, Oep 1 and Oep 4 respectively indicate different OEPs. A front half segment of a path segment is located at a node A, and a rear half segment of the path segment is located at a node B. For the front half segment and the rear half segment of each path segment, half segment properties may include a node identification (Id), an OEP, a modulation mode used by the OEP, a port Id, and so on. In FIG. 3, a port of the front half segment of the path segment is a port 2 of the node A, and a port of the rear half segment of the path segment is a port 1 of the node B.

At step S2, it is tried to allocate, in sequence, for each path segment of the service path a service processing manner that satisfies a service spectrum requirement in an order of path segments of the service path from front to rear.

In practical implementation, after each path segment is obtained, a service processing manner may be allocated for each path segment. Herein, the service processing manner may include: an internal path used by the path segment, and a modulation mode used by the path segment. Herein, the internal path used by the path segment may be a through path (i.e., a path constructed directly without using an OEP), and may also be a path constructed based on an OEP. Exemplarily, when the internal path used by the path segment is a path constructed based on an OEP, the modulation mode used by the path segment is a modulation mode used by the corresponding OEP; and when the internal path used by the path segment is a through path, the modulation mode used by the path segment is a modulation mode used by an OEP in a previous non-through path (a path constructed based on an OEP).

In the present embodiment, in an implementation of this step, p is used to indicate the number of path segments of the service path, and respective path segments on the service path are a $1^{st}$ path segment to a $P^{th}$ path segment sequentially in an order from front to rear. When i is in a range of 1 to P and when a service processing manner that satisfies a service spectrum requirement is present in unallocated service processing manners for an $i^{th}$ path segment of the service path, the service processing manner that satisfies the service spectrum requirement, which is from the unallocated service processing manners for the $i^{th}$ path segment, is allocated for the $i^{th}$ path segment.

Further, when it is tried to allocate a service processing manner that satisfies a service spectrum requirement for any path segment, which is not a first path segment, on the service path and no service processing manner that satisfies a service spectrum requirement is present in unallocated service processing manners for the any path segment, it is tried to reallocate a service processing manner that satisfies a service spectrum requirement, which is from unallocated service processing manners for a specific path segment, for the specific path segment, the specific path segment being a path segment prior to the any path segment.

When reallocating a service processing manner that satisfies a service spectrum requirement is performed for the specific path segment, it is tried to allocate, in sequence, a service processing manner that satisfies a service spectrum requirement for each of path segments following the specific path segment in an order of path segments of the service path from front to rear.

That is, for the $i^{th}$ path segment of the service path, if i is greater than 1 and when no service processing manner that satisfies a service spectrum requirement is present in unallocated service processing manners for the $i^{th}$ path segment, the specific path segment is an $(i-1)^{th}$ path segment of the service path, and at this time, it may be tried to reallocate a service processing manner that satisfies a service spectrum requirement, which is from unallocated service processing manners for the $(i-1)^{th}$ path segment, for the $(i-1)^{th}$ path segment. If a service processing manner that satisfies a service spectrum requirement is reallocated for the $(i-1)^{th}$ path segment, it may be tried to allocate, in sequence, a service processing manner that satisfies a service spectrum requirement for each of the $i^{th}$ path segment to the $P^{th}$ path segment in an order of path segments of the service path from front to rear.

In an alternate embodiment, when i is in a range of 2 to P and when no service processing manner that satisfies a service spectrum requirement is present in unallocated service processing manners for the $i^{th}$ path segment of the service path, it may be determined that no service processing manner that satisfies a service spectrum requirement can be allocated for the $i^{th}$ path segment.

In practical implementation, when i is in a range from 1 to P and when it is tried to allocate a service processing manner for the $i^{th}$ path segment of the service path, service processing manners are selected, in sequence, from unallocated service processing manners for the $i^{th}$ path segment of the service path. When a service processing manner that satisfies a service spectrum requirement is selected, a currently selected service processing manner is allocated for the $i^{th}$ path segment.

When the i is in the range of 2 to P and if no service processing manner that satisfies a service spectrum requirement is present in unallocated service processing manners for the $i^{th}$ path segment of the service path, service processing manners may be selected, in sequence, from unallocated service processing manners for the $(i-1)^{th}$ path segment of the service path, and it may be determined whether a selected service processing manner satisfies a service spectrum requirement. When a service processing manner that satisfies a service spectrum requirement is selected, a currently selected service processing manner is allocated for the $(i-1)^{th}$ path segment; or it is determined that no service processing manner that satisfies a service spectrum requirement is present in the unallocated service processing manners for the $(i-1)^{th}$ path segment of the service path.

In the present embodiment, a process of trying to allocate a service processing manner for a path segment may be called a process of constructing a path segment. If no service processing manner that satisfies a service spectrum requirement is present in unallocated service processing manners for a path segment, it may be considered that constructing the path segment fails. If a service processing manner that satisfies a service spectrum requirement, which is from unallocated service processing manners for a path segment, can be allocated for the path segment, it may be considered that constructing the path segment succeeds.

In practical implementation, when i is in a range of 1 to P, if constructing the $i^{th}$ path segment fails, the process may backtrack to the $(i-1)^{th}$ path segment. Then, it is tried to allocate a service processing manner, based on unallocated service processing manners for the $(i-1)^{th}$ path segment, for the $(i-1)^{th}$ path segment. If it is determined that a currently allocated service processing manner of the $(i-1)^{th}$ path segment satisfies a service spectrum requirement, it is indicated that reconstructing the $(i-1)^{th}$ path segment succeeds; and if it is determined that no service processing manner that satisfies a service spectrum requirement is present in unallocated service processing manners for the $(i-1)^{th}$ path segment of the service path, it is indicated that reconstructing the $(i-1)^{th}$ path segment fails.

As can be seen, if constructing the $i^{th}$ path segment fails, the process may backtrack, and reconstructing a path segment prior to the $i^{th}$ path segment is performed. After reconstructing the path segment prior to the $i^{th}$ path segment succeeds, respective path segments may be constructed starting from the path segment prior to the $i^{th}$ path segment in an order of path segments on the service path from front to rear. After reconstructing the path segment prior to the $i^{th}$ path segment fails, if the path segment prior to the $i^{th}$ path segment is not a first path segment of the service path, the process may continue to backtrack, and reconstructing a corresponding path segment is performed; and if the path segment prior to the $i^{th}$ path segment is the first path segment of the service path, it is determined that a process of performing spectrum allocation for an optical network fails, and the process ends directly.

Obviously, by manners of path segment backtracking and reconstructing path segments described above, a first result and a second result may be obtained finally. Herein, the first result indicates that a currently allocated service processing manner of each path segment of the service path satisfies a service spectrum requirement, i.e., path segments of the service path are all constructed successfully; and the second result indicates that the path segments of the service path cannot be constructed successfully at the same time, i.e., a process of performing spectrum allocation for an optical network fails.

Illustration is made below by a specific example.

A service path includes three path segments, which are respectively indicated as a path segment 1, a path segment 2, and a path segment 3. When constructing the path segment 3 fails at a certain time, the process backtracks to the path segment 2, and reconstructing the path segment 2 is performed. If reconstructing the path segment 2 succeeds, reconstructing the path segment 3 may be performed. If reconstructing the path segment 3 succeeds, it is indicated that three path segments of the service path are all constructed successfully. If reconstructing the path segment 2 fails, the process may backtrack to the path segment 1, and if reconstructing the path segment 1 fails, it is indicated that a process of performing spectrum allocation for an optical network fails.

Specifically, constructing a path segment may include constructing a front half segment of the path segment and constructing a rear half segment of the path segment. If no service processing manner that satisfies a service spectrum requirement is present in unallocated service processing manners for the front half segment of the path segment, it may be considered that constructing the front half segment of the path segment fails. If a service processing manner that satisfies a service spectrum requirement, which is from unallocated service processing manners for the front half segment of the path segment, may be allocated for the front half segment of the path segment, it may be considered that constructing the front half segment of the path segment succeeds. If no service processing manner that satisfies a service spectrum requirement is present in unallocated service processing manners for the rear half segment of the path segment, it may be considered that constructing the rear half segment of the path segment fails. If a service processing manner that satisfies a service spectrum requirement, which is from unallocated service processing manners for the rear half segment of the path segment, may be allocated for the rear half segment of the path segment, it may be considered that constructing the rear half segment of the path segment succeeds. For a front half segment and a rear half segment of a same path segment, it may be considered that constructing the path segment succeeds only when both the front half segment of the path segment and the rear half segment of the path segment are constructed successfully.

In an alternate embodiment, when i is in a range of 1 to P and when a service processing manner that satisfies a service spectrum requirement has been allocated to a front half segment of an $i^{th}$ path segment, a service processing manner, which is from unallocated service processing manners for a rear half segment of the $i^{th}$ path segment, may be allocated for the rear half segment of the $i^{th}$ path segment. That is, when constructing the front half segment of the $i^{th}$ path segment succeeds, constructing the rear half segment of the $i^{th}$ path segment may be performed.

When i is in a range of 1 to P and when no service processing manner that satisfies a service spectrum requirement has been allocated to the front half segment of the $i^{th}$ path segment, or when a service processing manner that satisfies a service spectrum requirement has been allocated to the front half segment of the $i^{th}$ path segment and no service processing manner that satisfies a service spectrum requirement is present in unallocated service processing manners for the rear half segment of the $i^{th}$ path segment, a service processing manner is allocated for the front half segment of the $i^{th}$ path segment. That is, when the front half segment of the $i^{th}$ path segment is not constructed, constructing the front half segment of the $i^{th}$ path segment may be performed; and when constructing the front half segment of the $i^{th}$ path segment succeeds but constructing the rear half segment of the $i^{th}$ path segment fails, reconstructing the front half segment of the $i^{th}$ path segment may be performed.

When i is in a range of 1 to P, for implementation of constructing the front half segment of the $i^{th}$ path segment, exemplarily, when a service processing manner that satisfies a service spectrum requirement is present in unallocated service processing manners for the front half segment of the $i^{th}$ path segment, a service processing manner that satisfies a service spectrum requirement, which is from the unallocated service processing manners for the front half segment of the $i^{th}$ path segment, is allocated for the front half segment of the $i^{th}$ path segment. At this time, constructing the front half segment of the $i^{th}$ path segment succeeds. When no service processing manner that satisfies a service spectrum requirement is present in unallocated service processing manners for the front half segment of the $i^{th}$ path segment, it is determined that no service processing manner that satisfies a service spectrum requirement is present in unallocated service processing manners for the $i^{th}$ path segment. That is, when constructing the front half segment of the $i^{th}$ path segment fails, it is considered that constructing the $i^{th}$ path segment fails.

When i is in a range of 1 to P, for implementation of constructing the rear half segment of the $i^{th}$ path segment, exemplarily, when a service processing manner that satisfies a service spectrum requirement is present in unallocated service processing manners for the rear half segment of the $i^{th}$ path segment, a service processing manner that satisfies a service spectrum requirement, which is from the unallocated service processing manners for the rear half segment of the $i^{th}$ path segment, is allocated for the rear half segment of the $i^{th}$ path segment. At this time, constructing the rear half segment of the $i^{th}$ path segment succeeds.

When i is in a range of 1 to P, for implementation of constructing the front half segment of the $i^{th}$ path segment, exemplarily, selecting an internal path is performed at least once from internal paths that can be used by the front half segment of the $i^{th}$ path segment. When an internal path selected at a $j^{th}$ time can satisfy a spectrum requirement of a service under any selected modulation mode, a following service processing manner is allocated for the front half segment of the $i^{th}$ path segment: a service processing manner obtained based on the internal path selected at the $i^{th}$ time and a corresponding selected modulation mode, j being an integer greater than or equal to 1, the selected modulation mode being a modulation mode that can be used by the internal path selected at the $j^{th}$ time. For example, the internal path selected at the $j^{th}$ time is a path constructed based on an OEP4, the OEP4 indicating an OEP that can be used by the front half segment of the $i^{th}$ path segment, and the modulation mode that can be used by the internal path selected at the $j^{th}$ time is a modulation mode that can be used by the OEP 4. For example, the modulation mode that can be used by the internal path selected at the $j^{th}$ time may be a quadrature phase shift keying (QPSK) and a 16 quadrature amplitude modulation (QAM). If the path constructed based on the OEP4 can satisfy a spectrum requirement of a service under a QPSK modulation mode, a following service processing manner is allocated for the front half segment of the $i^{th}$ path segment: a service processing manner based on the OEP4 and the QPSK modulation mode.

Further, n indicates the number of the internal paths that can be used by the front half segment of the $i^{th}$ path segment. When j is less than n and when the internal path selected at the $j^{th}$ time cannot satisfy a spectrum requirement of a service under any selected modulation mode, selecting an internal path is performed again from internal paths that can be used by the front half segment of the $i^{th}$ path segment and have not been selected. When j is equal to n and when the internal path selected at the $j^{th}$ time cannot satisfy a spectrum requirement of a service under any selected modulation mode, it is determined that no service processing manner that satisfies a service spectrum requirement is present in unallocated service processing manners for the front half segment of the $i^{th}$ path segment. That is, constructing the front half segment of the $i^{th}$ path segment fails.

In practical implementation, an OEP that satisfies a first set condition may be selected from a list of candidate OEPs of the front half segment of the $i^{th}$ path segment. The list of candidate OEPs of the front half segment of the $i^{th}$ path segment includes at least one physical OEP and one virtual OEP. The virtual OEP is used for indicating a through path that does not use a physical OEP. The virtual OEP can use all frequencies of the optical network. That is, any spectrum of the optical network may be allocated for the virtual OEP. In other words, no limitation is made to an allocatable spectrum range for the virtual OEP.

Correspondingly, the internal paths that can be used by the front half segment of the $i^{th}$ path segment are paths constructed based on a selected OEP that satisfies the first set condition.

Herein, the first set condition includes:

a candidate OEP and a router half-hop port form a connection;

when the $i^{th}$ path segment is a first path segment of the service path, the candidate OEP is located at a service access electrical cross-connection subrack, i.e., the candidate OEP being located on a service access electrical cross-connection subrack; and when the $i^{th}$ path segment is not the first path segment of the service path and an OEP of the rear half segment of the $(i-1)^{th}$ path segment is a virtual OEP, the candidate OEP is a virtual OEP; and when the $i^{th}$ path segment is not the first path segment of the service path and the OEP of the rear half segment of the $(i-1)^{th}$ path segment is not a virtual OEP, the candidate OEP and the OEP used by the rear half segment of the $(i-1)^{th}$ path segment are located at a same electrical cross-connection subrack.

In an embodiment, if an intersection set of available frequencies for an OEP selected at the $j^{th}$ time and a router half-hop port used by the front half segment of the $i^{th}$ path segment can satisfy a spectrum requirement of a service under a selected modulation mode, it is considered that the internal path selected at the $j^{th}$ time satisfies the spectrum requirement of the service under the selected modulation mode. Otherwise, it is considered that the internal path selected at the $j^{th}$ time does not satisfy the spectrum requirement of the service under the selected modulation mode.

When i is in a range of 1 to P, for implementation of constructing the rear half segment of the $i^{th}$ path segment, exemplarily, selecting an internal path is performed at least once from internal paths that can be used by the rear half segment of the $i^{th}$ path segment. When an internal path selected at a $k^{th}$ time can satisfy a spectrum requirement of a service under a specific modulation mode and the $i^{th}$ path segment and a continuous through path segment prior to the $i^{th}$ path segment satisfy the spectrum requirement of the service under the specific modulation mode, a following service processing manner is allocated for the rear half segment of the $i^{th}$ path segment: a service processing manner obtained based on the internal path selected at the $k^{th}$ time and the specific modulation mode. Herein, k is an integer greater than or equal to 1; the specific modulation mode is a modulation mode in a currently allocated service processing manner for the front half segment of the $i^{th}$ path segment; and the through path segment indicates a path segment that satisfies a following condition: an internal path used by a rear half segment of the path segment is a through path.

For example, the internal path selected at the $k^{th}$ time is a through path segment (virtual OEP), the specific modulation mode is a modulation mode used by an OEP of the front half segment of the $i^{th}$ path segment. Herein, the modulation mode used by the OEP of the front half segment of the $i^{th}$ path segment is the QPSK, and thus the specific modulation mode is the QPSK. In this way, if the through path segment can satisfy a spectrum requirement of a service under a QPSK modulation mode and the continuous through path segment prior to the $i^{th}$ path segment can satisfy the spectrum requirement of the service under the QPSK modulation mode, a following service processing manner may be allocated for the rear half segment of the $i^{th}$ path segment: a service processing manner obtained based on the through path segment and the QPSK modulation mode.

Further, m indicates the number of the internal paths that can be used by the rear half segment of the $i^{th}$ path segment. When k is less than m, if the internal path selected at the $k^{th}$ time does not support the specific modulation mode, or the internal path selected at the $k^{th}$ time cannot satisfy the spectrum requirement of the service under the specific modulation mode, or the $i^{th}$ path segment and the continuous through path segment prior to the $i^{th}$ path segment cannot satisfy the spectrum requirement of the service under the specific modulation mode, selecting an internal path is performed again from internal paths that can be used by the rear half segment of the $i^{th}$ path segment and have not been selected.

When k is equal to n, if the internal path selected at the $k^{th}$ time does not support the specific modulation mode, or the internal path selected at the $k^{th}$ time cannot satisfy the spectrum requirement of the service under the specific modulation mode, or the $i^{th}$ path segment and the continuous through path segment prior to the $i^{th}$ path segment do not satisfy the spectrum requirement of the service under the specific modulation mode, it is determined that no service processing manner that satisfies a service spectrum requirement is present in unallocated service processing manners for the rear half segment of the $i^{th}$ path segment. That is, it can be determined that constructing of the rear half segment of the $i^{th}$ path segment fails.

In practical implementation, an OEP that satisfies a second set condition is selected from a list of candidate OEPs of the rear half segment of the $i^{th}$ path segment. The list of candidate OEPs of the rear half segment of the $i^{th}$ path segment includes at least one physical OEP and one virtual OEP. The virtual OEP is used for indicating a through path that does not use a physical OEP.

Correspondingly, the internal paths that can be used by the rear half segment of the $i^{th}$ path segment are paths constructed based on a selected OEP that satisfies the second set condition.

Herein, the second set condition includes:

a candidate OEP and a router half-hop port form a connection; and when the $i^{th}$ path segment is a last path segment of the service path, the candidate OEP is located at a service access electrical cross-connection subrack.

Exemplarily, when k is in a range of 1 to m and selecting an internal path is performed for the $k^{th}$ time, if a through path has not been selected, the through path may be selected preferably. Otherwise, a path constructed based on a physical OEP is selected randomly.

In an embodiment, if an intersection set of available frequencies for an OEP selected at the $k^{th}$ time and a router half-hop port used by the rear half segment of the $i^{th}$ path segment can satisfy a spectrum requirement of a service under a specific modulation mode, it is considered that the internal path selected at the $k^{th}$ time satisfy the spectrum requirement of the service under the specific modulation mode. Otherwise, it is considered that the internal path selected at the $k^{th}$ time do not satisfy the spectrum requirement of the service under the specific modulation mode.

If an intersection set of available frequencies for all router half-hop ports, all OEPs used by the front half segment, and all OEPs used by the rear half segment on the $i^{th}$ path segment and the continuous through path segment prior to the $i^{th}$ path segment can satisfy a spectrum requirement of a service under a specific modulation mode, it is considered that the $i^{th}$ path segment and the continuous through path segment prior to the $i^{th}$ path segment satisfy the spectrum requirement of the service under the specific modulation mode. Otherwise, it is considered that the $i^{th}$ path segment and the continuous through path segment prior to the $i^{th}$ path segment do not satisfy the spectrum requirement of the service under the specific modulation mode.

At step S3, when a currently allocated service processing manner of each path segment of the service path satisfies the service spectrum requirement, a frequency used by each path segment on the service path is allocated according to the currently allocated service processing manner of each path segment of the service path.

In practical implementation, a range of an optional frequency may be obtained for a currently allocated service processing manner of each path segment of the service path; and a frequency used by each path segment on the service path is allocated from an intersection set of respective ranges of the optional frequency.

Specifically, a frequency used by a service may be allocated from an intersection set of available frequencies for a router half-hop port, an OEP used by the front half segment, and an OEP used by the rear half segment of each path segment. If the path segment is a through path segment, it is required to allocate the frequency used by the service from an intersection set of available frequencies for all router half-hop ports, all OEPs used by the front half segment, and all OEPs used by the rear half segment of a continuous through path segment and a following non-through path segment.

In practical application, step S1 to step S3 may all be implemented by a device such as a processor.

As can be seen, in a process of performing spectrum allocation, a spectrum solution for an option network provided in present embodiment does not need to discretize an available frequency set and then perform numbering in advance and does not need to perform spectrum allocation through a matrix operation, so that time for performing spectrum allocation in the optical network can be shortened, which improves efficiency of performing spectrum allocation. In addition, a process of constructing the path segment embodies deep optimization to a spectrum allocation process, thereby consuming less time, and time for performing spectrum allocation in the optical network can be further reduced.

Embodiment Two

For better illustration of the present disclosure, further examples will now be introduced on the basis of Embodiment One of the present disclosure.

Figure 4:
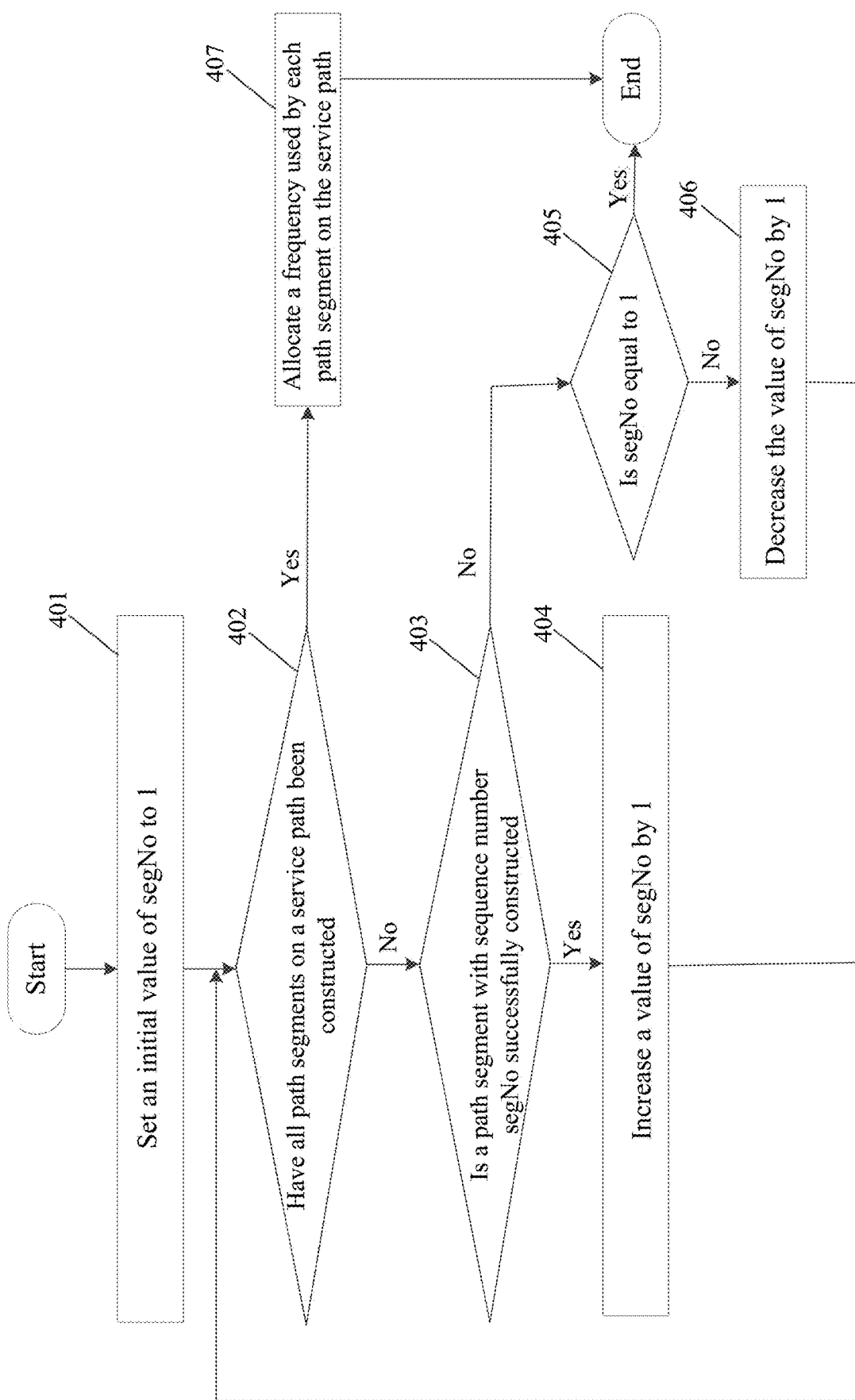
FIG. 4 is a second flowchart of a spectrum allocation method for an optical network according to an embodiment of the present disclosure.

FIG. 4 is a second flowchart of a spectrum allocation method for an optical network according to an embodiment of the present disclosure. As shown in FIG. 4, the process may include step 401 to step 407.

At step 401, an initial value of sequence number segNo of a path segment is set to 1.

At step 402, it is determined whether all path segments on a service path have been constructed. If so, step 407 is executed; if not, step 403 is executed.

At step 403, process A is invoked to construct a path segment with sequence number segNo. It is determined whether the path segment with sequence number segNo is successfully constructed. If so, step 404 is executed; if not, step 405 is executed.

At step 404, the value of segNo is increased by 1, and the process returns to step 402.

At step 405, it is determined whether segNo is equal to 1. If segNo is equal to 1, it is determined that the spectrum allocation has failed, and the process can be ended. If segNo is not equal to 1, step 406 is executed.

At step 406, the value of segNo is decreased by 1, and the process returns to step 402.

At step 407, a frequency used by each path segment on the service path is allocated.

The implementation of this step has been described in the foregoing embodiment, and will not be repeated here.

Before executing process A, the service path of the optical network may be segmented to obtain at least one path segment. A front half segment and a rear half segment of each path segment are respectively located at two adjacent nodes of the service path.

After path segments are obtained by service path segmentation, the implementation of process A may be illustrated with reference to FIG. 5.

Figure 5:
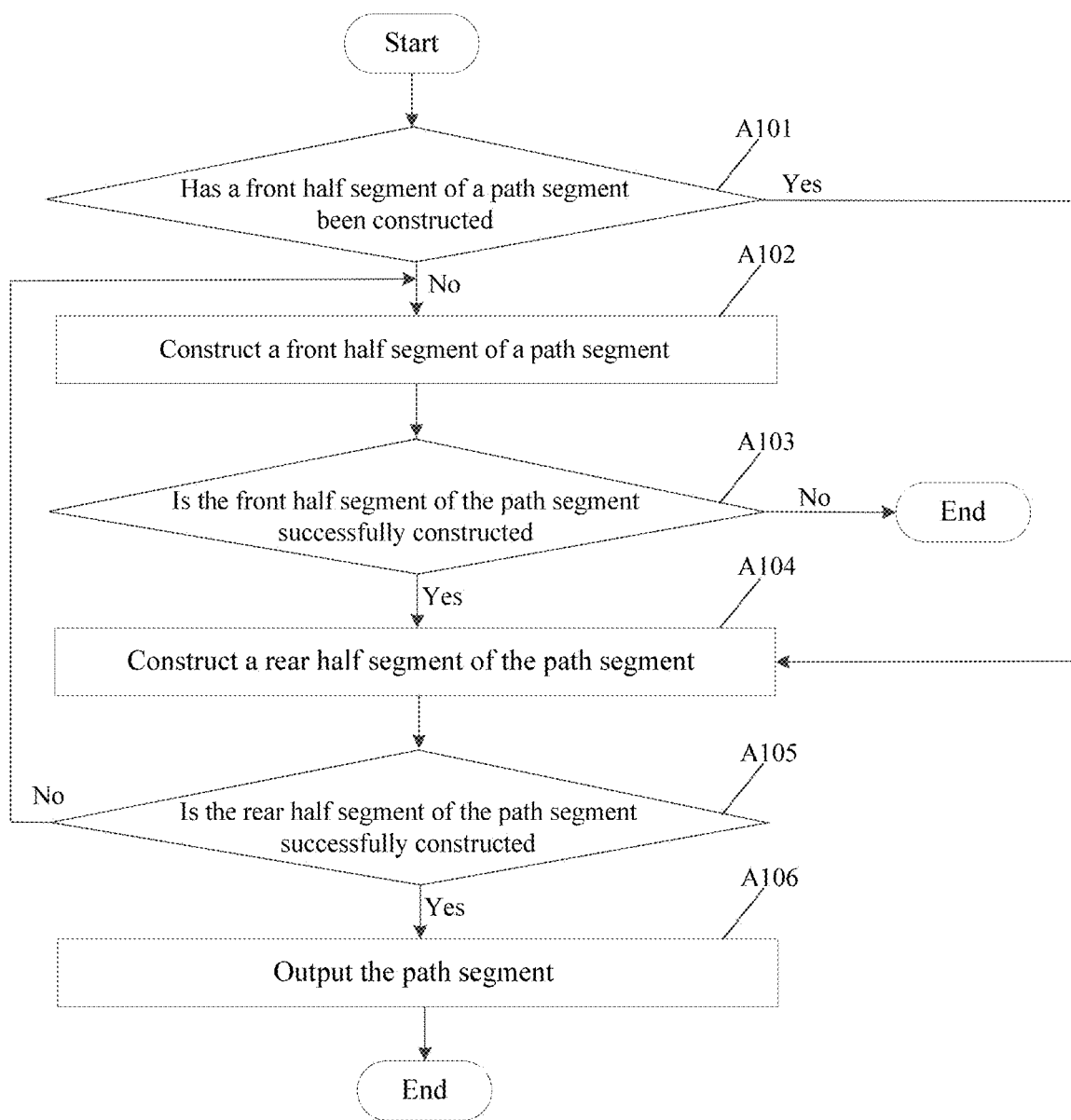
FIG. 5 is a schematic diagram of process A involved in a spectrum allocation method for an optical network according to an embodiment of the present disclosure.

FIG. 5 is a schematic diagram of process A involved in a spectrum allocation method for an optical network according to an embodiment of the present disclosure. As shown in FIG. 5, process A may include step A101 to step A106.

At step A101, it is determined whether a front half segment of a path segment has been constructed. If the front half segment of the path segment has been constructed, step A104 is executed. Exemplarily, if a path segment after a certain path segment fails to be constructed, when the process backtracks to said certain path segment, a front half segment of this path segment has been constructed.

If the front half segment of the path segment has not been constructed, step A102 is executed.

At step A102, process B is invoked to construct the front half segment of the path segment.

At step A103, it is determined whether the front half segment of the path segment is successfully constructed. If so, step A104 is executed; if not, it means that the process of constructing the path segment has failed, and the process can be ended directly.

At step A104, process C is invoked to construct a rear half segment of the path segment.

At step A105, it is determined whether the rear half segment of the path segment is successfully constructed. If so, step A106 is executed; if not, the process returns to step A102.

At step A106, the successfully constructed front half segment and rear half segment are combined into a path segment and output.

The implementations of process B and process C will be described below with reference to FIG. 6 and FIG. 7, respectively.

Figure 6:
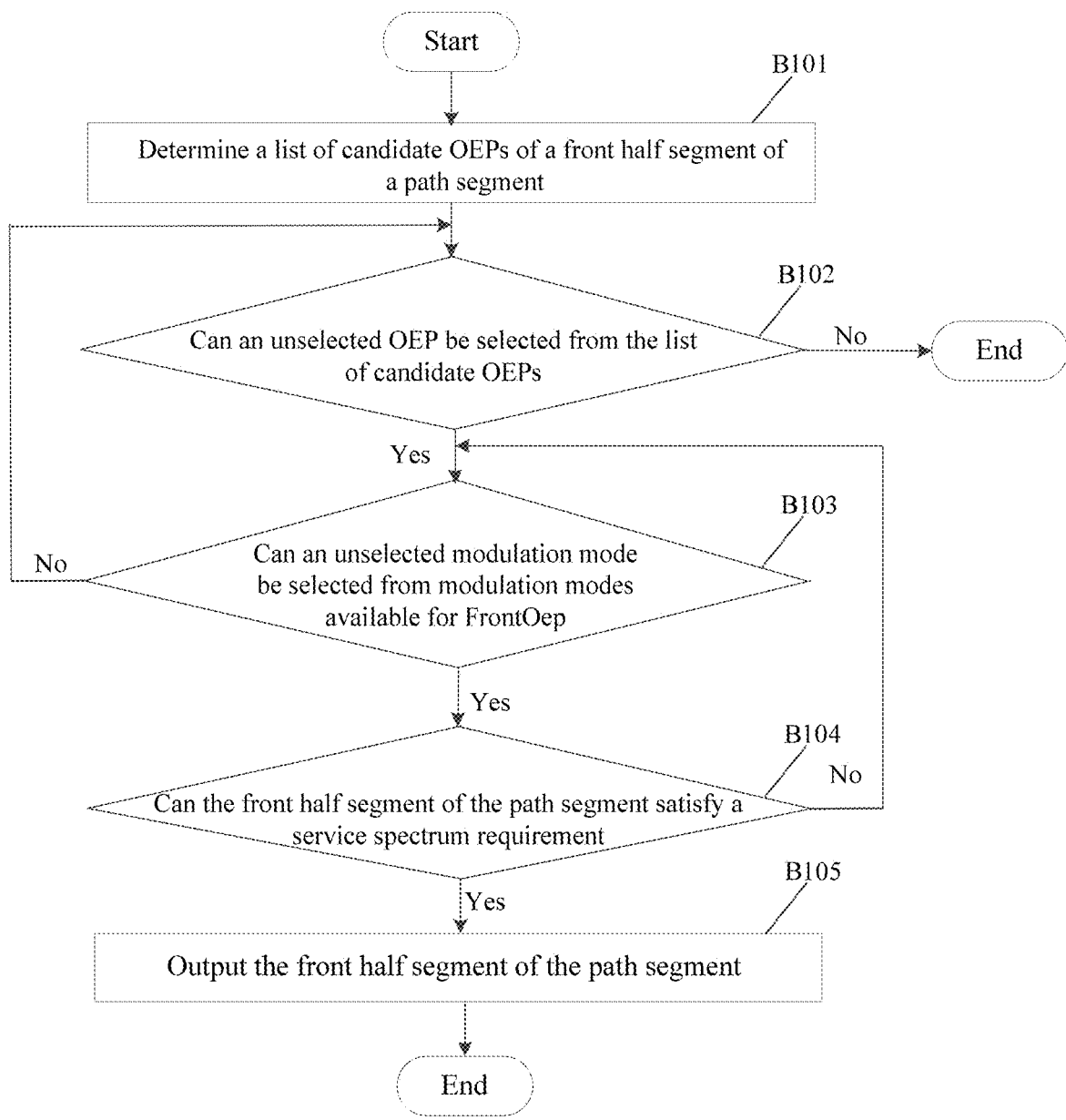
FIG. 6 is a schematic diagram of process B involved in the spectrum allocation method for an optical network according to an embodiment of the present disclosure.

FIG. 6 is a schematic diagram of process B involved in the spectrum allocation method for an optical network according to an embodiment of the present disclosure. As shown in FIG. 6, process B may include step B101 to step B 105.

At step B101, a list of candidate OEPs of a front half segment of a path segment is determined.

The implementation of this step has been described in the foregoing embodiment, and will not be repeated here.

At step B102, it is determined whether an unselected OEP can be selected from the list of candidate OEPs. If not, it is considered that the process of constructing the front half segment of the path segment has failed, and the process of constructing the front half segment of the path segment can be ended; if so, step B103 is executed.

At step B103, an unselected OEP is randomly selected from the list of candidate OEPs, and the currently selected OEP is recorded as FrontOep. It is determined whether an unselected modulation mode can be selected from modulation modes available for FrontOep. If not, the process returns to step B102; if so, step B104 is executed.

At step B104, an unselected modulation mode is selected from modulation modes available for FrontOep, and the currently selected modulation mode is recorded as a selected modulation mode. It is determined whether the front half segment of the path segment can satisfy a spectrum requirement of a service, namely, it is determined whether an intersection set of available frequencies for FrontOep and a router half-hop port of the front half segment of the path segment can satisfy a spectrum requirement of a service under the selected modulation mode. If not, the process returns to step B103; if so, step B105 is executed.

At step B105, the front half segment of the path segment is output, and then process B is ended.

Here, outputting the front half segment of the path segment may means using a service processing mode based on FrontOep and the selected modulation mode as a service processing mode currently allocated for the front half segment of the path segment.

Figure 7:
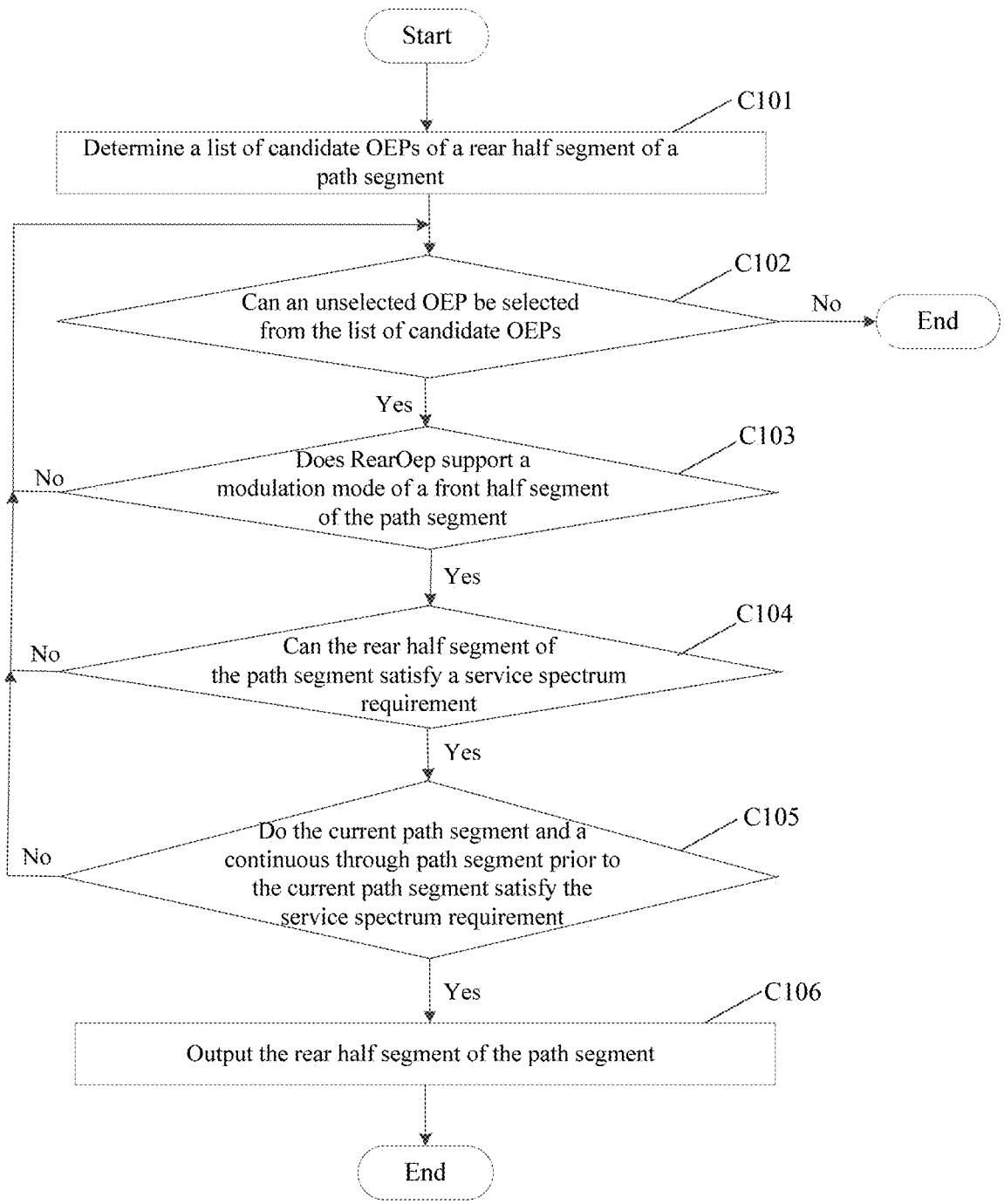
FIG. 7 is a schematic diagram of process C involved in the spectrum allocation method for an optical network according to an embodiment of the present disclosure.

FIG. 7 is a schematic diagram of process C involved in the spectrum allocation method for an optical network according to an embodiment of the present disclosure. As shown in FIG. 7, process C may include step C101 to step C106.

At step C101, a list of candidate OEPs of a rear half segment of the path segment is determined.

The implementation of this step has been described in the foregoing embodiment, and will not be repeated here.

At step C102, it is determined whether an unselected OEP can be selected from the list of candidate OEPs. If not, it is considered that the process of constructing the rear half segment of the path segment has failed, and the process of constructing the rear half segment of the path segment can be ended; if so, step C103 is executed.

At step C103, an unselected OEP is randomly selected from the list of candidate OEPs, and the currently selected OEP is recorded as RearOep. It is determined whether RearOep supports the modulation mode of the front half segment of the path segment. If not, the process returns to step C102; if so, step C104 is executed.

At step C104, it is determined whether the rear half segment of the path segment can satisfy a spectrum requirement of a service, namely, it is determined whether an intersection set of available frequencies for RearOep and a router half-hop port of the rear half segment of the path segment can satisfy a spectrum requirement of a service under the selected modulation mode. If not, the process returns to step C102, and if so, step C105 is executed.

In this step, the selected modulation mode is the modulation mode of the front half segment of the path segment.

At step C105, it is determined whether the current path segment and a continuous through path segment prior to the current path segment can satisfy the spectrum requirement of the service, namely, it is determined whether an intersection set of available frequencies for all FrontOeps, router half-hop ports, and RearOeps on the current path segment and on the previous continuous through path segment can satisfy the spectrum requirement of the service under the selected modulation mode. If not, the process returns to step C102; if so, step C106 is executed.

At step C106, the rear half segment of the path segment is output, and then process C is ended.

Here, outputting the rear half segment of the path segment may means using a service processing mode based on RearOep and the selected modulation mode as a service processing mode currently allocated for the rear half segment of the path segment.

Embodiment Three

For better illustration of the present disclosure, further examples will now be introduced on the basis of the foregoing embodiments of the present disclosure.

Figure 8:
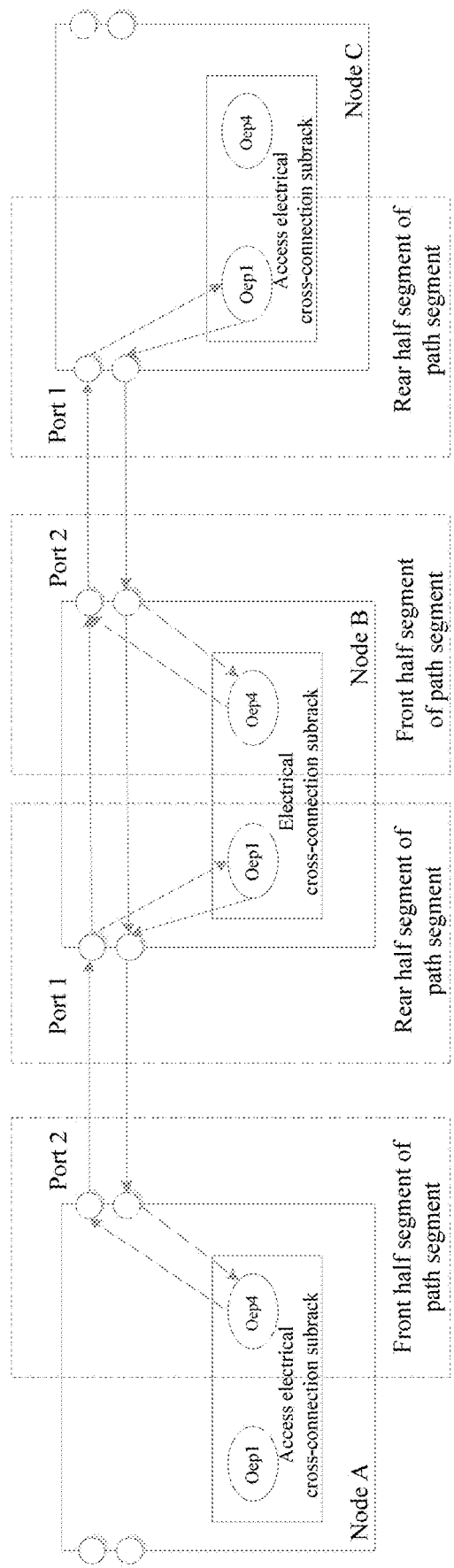
FIG. 8 is a schematic diagram of an application scenario according to an embodiment of the present disclosure.

FIG. 8 is a schematic diagram of an application scenario according to an embodiment of the present disclosure. As shown in FIG. 8, this scenario represents a scenario where nodes are directly connected during a spectrum allocation process. In this scenario, a service path includes three nodes, i.e., node A, node B, and node C. Each node is provided with an electrical cross-connection subrack. The electrical cross-connection subracks provided at node A and node C are service access electrical cross-connection subracks. The ports through which the service path passes are port 2 of node A, port 1 of node B, port 2 of node B, and port 1 of node C. Oep1 and Oep4 represent different OEPs.

In practical implementation, two path segments, i.e., path segment 1 and path segment 2, can be obtained by service path segmentation. Path segment 1 corresponds to a path from port 2 of node A to port 1 of node B, and path segment 2 corresponds to a path from port 2 of node B to port 1 of node C. OEPs available for a front half segment of path segment 1 include Oep4 of the electrical cross-connection subrack of node A, and a router half-hop port of the front half segment of path segment 1 is port 2 of node A. OEPs available for a rear half segment of path segment 1 include Oep1 of the electrical cross-connection subrack of node B, and a router half-hop port of the rear half segment of path segment 1 is port 1 of node B. OEPs available for a front half segment of path segment 2 include Oep4 of the electrical cross-connection subrack of node B, and a router half-hop port of the front half segment of path segment 2 is port 2 of node B. OEPs available for a rear half segment of path segment 2 include Oep1 of the electrical cross-connection subrack of node C, and a router half-hop port of the rear half segment of path segment 2 is port 1 of node C.

Here, the service in the optical network may be 100G optical layer service, and modulation modes supported by all OEPs are [QPSK, 16QAM].

According to the disclosure in the foregoing embodiments, for the scenario shown in FIG. 8, an example spectrum allocation method for an optical network may include step 401 to step 407.

At step 401, an initial value of segNo is set to 1.

At step 402, it is determined whether all path segments on a service path have been constructed. Here, not all path segments on the service path have been constructed. In this case, step 403 is executed.

At step 403, process A is invoked to construct a path segment with sequence number 1, namely, process A is invoked to construct path segment 1.

Specifically, invoking process A to construct path segment 1 may include step A101 to step A106.

At step A101, it is determined that a front half segment of path segment 1 has not been constructed, and step A102 is executed.

At step A102, process B is invoked to construct the front half segment of path segment 1.

Specifically, invoking process B to construct the front half segment of path segment 1 may include step B101 to step B105.

At step B101, a list of candidate OEPs [Oep4] of the front half segment of path segment 1 is determined.

At step B102, it is determined that an unselected OEP can be randomly selected from the list, and step B103 is executed.

At step B103, an unselected OEP is randomly selected from the list. Here, only Oep4 can be selected, and the selected Oep4 is recorded as FrontOep. It is determined that an unselected modulation mode can be selected from modulation modes available for FrontOep, and step B104 is executed.

At step B104, an unselected modulation mode is selected from modulation modes available for FrontOep. For example, a modulation mode QPSK can be selected here. It is determined whether the front half segment of the path segment can satisfy a spectrum requirement of a service. Here, an intersection set of frequencies for Oep4 and port 2 of node A satisfies a spectrum requirement of a service under the selected modulation mode QPSK.

At step B105, the front half segment of path segment 1 is output.

After step A102, it is determined that the front half segment of path segment 1 is successfully constructed. In this case, step A104 is executed.

At step A104, process C is invoked to construct a rear half segment of path segment 1.

Specifically, invoking process C to construct a rear half segment of path segment 1 may include step C101 to step C106.

At step C101, a list of candidate OEPs [through OEP1, Oep1] of the rear half segment of path segment 1 is determined. Here, through OEP1 indicates a through path that is directly available for the rear half segment of path segment 1.

At step C102, it is determined that an unselected OEP can be selected from the list of candidate OEPs. In this case, step C103 is executed.

At step C103, an unselected OEP is randomly selected from the list of candidate OEPs. Here, through OEP1 is preferably selected, and it is recorded as RearOep. The modulation mode of through OEP1 is forcibly changed to the modulation mode of the front half segment of path segment 1. It is determined whether RearOep supports the modulation mode of the front half segment of path segment 1. Here, RearOep supports the modulation mode of the front half segment of path segment 1, and step C104 is executed.

At step C104, it is determined whether the rear half segment of path segment 1 can satisfy the spectrum requirement of the service. Here, an intersection set of available frequencies for through OEP1 and port 1 of Node B satisfies the spectrum requirement of the service under the selected modulation mode QPSK. In this case, step C105 can be executed.

At step C105, it is determined whether the current path segment and a continuous through path segment prior to the current path segment can satisfy the spectrum requirement of the service. Here, an intersection set of available frequencies for Oep4 of node A, port 2 of node A, port 1 of node B, and through OEP1 of node B satisfies the spectrum requirement of the service under the selected modulation mode QPSK. In this case, step C106 is executed.

At step C106, the rear half segment of path segment 1 is output.

After step A104, it is determined that the rear half segment of path segment 1 is successfully constructed. In this case, step A106 is executed.

At step A106, path segment 1 is formed and output.

After path segment 1 is successfully constructed, step 404 is executed.

At step 404, the value of segNo is increased by 1, and the process returns to step 402.

At step 402, it is determined whether all path segments on the service path have been constructed. Here, path segment 2 has not been constructed yet. In this case, step 403 is continuously executed.

At step 403, process A is invoked to construct a path segment with sequence number 2.

Specifically, invoking process A to construct a path segment with sequence number 2 may include step A101 to step A106.

At step A101, it is determined that a front half segment of path segment 2 has not been constructed, and step A102 is executed.

At step A102, process B is invoked to construct the front half segment of path segment 2.

Specifically, invoking process B to construct the front half segment of path segment 2 may include step B101 to step B105.

At step B101, a list of candidate OEPs [through OEP2] of the front half segment of path segment 2 is determined, because a through OEP is used for the rear half segment of path segment 1.

At step B102, it is determined whether an unselected OEP can be selected from the list of candidate OEPs. Here, an OEP can be selected, and step B103 is executed.

At step B103, an unselected OEP is randomly selected from the list of candidate OEPs. Here, only through OEP2 can be selected, and it is recorded as FrontOep. The modulation mode of through OEP2 is forcibly changed to the modulation mode QPSK of the rear half segment of path segment 1. It is determined whether an unselected modulation mode can be selected from modulation modes available for FrontOep. Here, an unselected modulation mode can be selected, and step B104 is executed.

At step B104, an unselected modulation mode is randomly selected from modulation modes available for FrontOep. Here, only the modulation mode QPSK can be selected. It is determined whether the front half segment of path segment 2 can satisfy the spectrum requirement of the service. Here, an intersection set of available frequencies for through OEP2 and port 2 of node B satisfies the spectrum requirement of the service under the selected modulation mode QPSK, and step B105 is executed.

At step B105, the front half segment of path segment 2 is output.

After step A102, it is determined that the front half segment of path segment 2 is successfully constructed. In this case, step A104 can be executed.

At step A104, process C is invoked to construct a rear half segment of path segment 2.

Specifically, invoking process C to construct a rear half segment of path segment 2 may include step C101 to step C106.

At step C101, a list of candidate OEPs [Oep1] of the rear half segment of path segment 2 is determined.

At step C102, it is determined whether an unselected OEP can be selected from the list of candidate OEPs. Here, an unselected OEP can be selected, and step C103 is executed.

At step C103, an unselected OEP is randomly selected from the list of candidate OEPs. Here, only Oep1 can be selected, and it is recorded as RearOep. It is determined whether RearOep supports the modulation mode of the front half segment of path segment 2. Here, RearOep can support the modulation mode of the front half segment of path segment 2, and step C104 is executed.

At step C104, it is determined whether the rear half segment of path segment 2 can satisfy the spectrum requirement of the service. Here, an intersection set of available frequencies for Oep1 and port 1 of node C satisfies the spectrum requirement of the service under the selected modulation mode QPSK, and step C105 is executed.

At step C105, it is determined whether the current path segment and a continuous through path segment prior to the current path segment can satisfy the spectrum requirement of the service. Here, an intersection set of available frequencies for Oep4 of node A, port 2 of node A, port 1 of node B, through OEP1 of node B, through OEP2 of node B, port 2 of node B, port 1 of node C, and Oep1 of node C satisfies the spectrum requirement of the service under the selected modulation mode QPSK, and step C106 is executed.

At step C106, the rear half segment of path segment 2 is output.

After step A104, it is determined that the rear half segment of path segment 2 is successfully constructed. At this time, step A106 is executed.

At step A106, path segment 2 is formed and output.

After path segment 2 is successfully constructed, step 404 is executed.

At step 404, the value of segNo is increased by 1, and the process returns to step 402.

At step 402, it is determined that all path segments on the service path have been constructed, and step 407 is executed.

At step 407, a frequency used by each path segment on the service path is allocated. Since path segment 1 is a through path segment, frequencies used by the service under the selected modulation mode QPSK are allocated from an intersection set of available frequencies for Oep4 of node A, port 2 of node A, port 1 of node B, through OEP1 of node B, through OEP2 of node B, port 2 of node B, port 1 of node C, and Oep1 of node C.

Embodiment Four

For better illustration of the present disclosure, further examples will now be introduced on the basis of the foregoing embodiments of the present disclosure.

Figure 9:
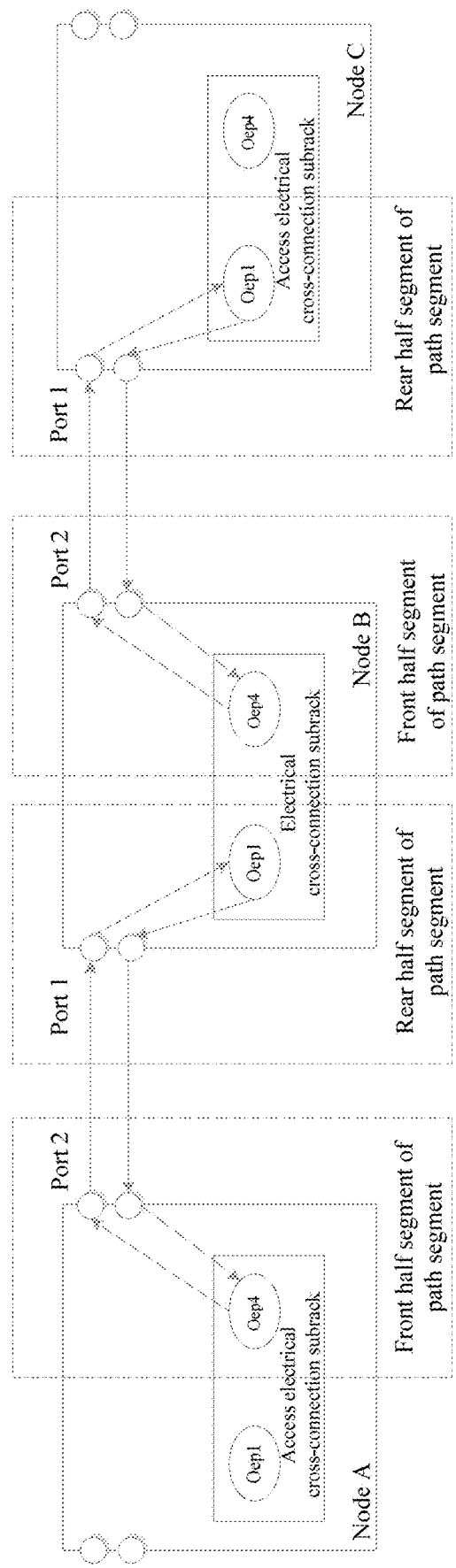
FIG. 9 is a schematic diagram of another application scenario according to an embodiment of the present disclosure.

FIG. 9 is another schematic diagram of an application scenario according to an embodiment of the present disclosure. As shown in FIG. 9, this scenario represents a scenario where OEPs are used in nodes during a spectrum allocation process. In this scenario, a service path includes three nodes, i.e., node A, node B, and node C. Each node is provided with an electrical cross-connection subrack. The electrical cross-connection subracks provided at node A and node C are service access electrical cross-connection subracks. The ports through which the service path passes are port 2 of node A, port 1 of node B, port 2 of node B, and port 1 of node C. Oep1 and Oep4 represent different OEPs. Compared with the scenario shown in FIG. 8, in the scenario shown in FIG. 9, the through paths in node B is cancelled.

In practical implementation, two path segments, i.e., path segment 1 and path segment 2, can be obtained by service path segmentation. Path segment 1 corresponds to a path from port 2 of node A to port 1 of node B, and path segment 2 corresponds to a path from port 2 of node B to port 1 of node C. OEPs available for a front half segment of path segment 1 include Oep4 of the electrical cross-connection subrack of node A, and a router half-hop port of the front half segment of path segment 1 is port 2 of node A. OEPs available for a rear half segment of path segment 1 include Oep1 of the electrical cross-connection subrack of node B, and a router half-hop port of the rear half segment of path segment 1 is port 1 of node B. OEPs available for a front half segment of path segment 2 include Oep4 of the electrical cross-connection subrack of node B, and a router half-hop port of the front half segment of path segment 2 is port 2 of node B. OEPs available for a rear half segment of path segment 2 include Oep1 of the electrical cross-connection subrack of node C, and a router half-hop port of the rear half segment of path segment 2 is port 1 of node C.

Here, the service in the optical network may be 100G optical layer service, and modulation modes supported by all OEPs are [QPSK, 16QAM].

According to the disclosure in the foregoing embodiments, for the scenario shown in FIG. 9, an example spectrum allocation method for an optical network may include step 401 to step 407.

At step 401, an initial value of sequence number segNo of a path segment is set to 1.

At step 402, it is determined whether all path segments on a service path have been constructed. Here, not all path segments on the service path have been constructed. In this case, step 403 is executed.

At step 403, process A is invoked to construct a path segment with sequence number 1.

Specifically, invoking process A to construct a path segment with sequence number 1 may include step A101 to step A106.

At step A101, it is determined that a front half segment of path segment 1 has not been constructed. In this case, step A102 is executed.

At step A102, process B is invoked to construct the front half segment of path segment 1.

Specifically, invoking process B to construct the front half segment of path segment 1 may include step B101 to step B105.

At step B101, a list of candidate OEPs [Oep4] of the front half segment of path segment 1 is determined.

At step B102, it is determined whether an unselected OEP can be selected from the list of candidate OEPs. Here, an unselected OEP can be selected, and step B103 is executed.

At step B103, an unselected OEP is selected from the list of candidate OEPs. Here, only Oep4 can be selected, and it is recorded as FrontOep. It is determined whether an unselected modulation mode can be selected from modulation modes available for FrontOep. If so, step B104 is executed.

At step B104, a modulation mode QPSK is selected from modulation modes available for FrontOep. It is determined whether the front half segment of the path segment can satisfy a spectrum requirement of the service. Here, an intersection set of frequencies for Oep4 and port 2 of node A satisfies the spectrum requirement of the service under the selected modulation mode QPSK.

At step B105, the front half segment of path segment 1 is output.

After step A102, it is determined that the front half segment of path segment 1 is successfully constructed, and step A104 is executed.

At step A104, process C is invoked to construct a rear half segment of path segment 1.

Specifically, invoking process C to construct a rear half segment of path segment 1 may include step C101 to step C106.

At step C101, a list of candidate OEPs [Oep1] of the rear half segment of the path segment is determined.

At step C102, it is determined whether an unselected OEP can be selected from the list of candidate OEPs. Here, an unselected OEP can be selected, and step C103 is executed.

At step C103, an unselected OEP is randomly selected from the list of candidate OEPs. Here, only Oep1 can be selected, and it is recorded as RearOep. It is determined whether RearOep supports the modulation mode of the front half segment of path segment 1. Here, RearOep supports the modulation mode of the front half segment of path segment 1, and step C104 is executed.

At step C104, it is determined whether the rear half segment of path segment 1 can satisfy the spectrum requirement of the service. Here, an intersection set of available frequencies for Oep1 and port 1 of Node B satisfies the spectrum requirement of the service under the selected modulation mode QPSK, and step C105 is executed.

At step C105, it is determined whether the current path segment and a continuous through path segment prior to the current path segment can satisfy the spectrum requirement of the service. Here, an intersection set of available frequencies for Oep4 of node A, port 2 of node A, port 1 of node B, and Oep1 of node B satisfies the spectrum requirement of the service under the selected modulation mode QPSK, and step C106 is executed.

At step C106, the rear half segment of path segment 1 is output.

After step A104, it is determined that the rear half segment of path segment 1 is successfully constructed, and step A106 is executed.

At step A106, path segment 1 is formed and output.

After step A106, it is determined that path segment 1 is successfully constructed, and step 404 is executed.

At step 404, the value of segNo is increased by 1, and the process returns to step 402.

At step 402, it is determined whether all path segments on the service path have been constructed. Here, path segment 2 has not been successfully constructed yet, and step 403 is continuously executed.

At step 403, process A is invoked to construct a path segment with sequence number 2.

Specifically, invoking process A to construct a path segment with sequence number 2 may include step A101 to step A106.

At step A101, it is determined that a front half segment of path segment 2 has not been constructed, and step A102 is executed.

At step A102, process B is invoked to construct the front half segment of path segment 2.

Specifically, invoking process B to construct the front half segment of path segment 2 may include step B101 to step B105.

At step B101, a list of candidate OEPs [through Oep4] of the front half segment of path segment 2 is determined, because Oep4 is located on the same electrical cross-connection subrack as Oep1 that is used for the rear half segment of path segment 1.

At step B102, it is determined whether an unselected OEP can be selected from the list of candidate OEPs. Here, an unselected OEP can be selected, and step B103 is executed.

At step B103, an unselected OEP is selected from the list of candidate OEPs. Here, only Oep4 can be selected, and it is recorded as FrontOep. It is determined whether an unselected modulation mode can be selected from modulation modes available for FrontOep. If so, step B104 is executed.

At step B104, an unselected modulation mode is randomly selected from the modulation modes available for FrontOep. Here, a modulation mode 16QAM can be selected. It is determined whether the front half segment of path segment 2 can satisfy the spectrum requirement of the service. Here, an intersection set of available frequencies for Oep4 and port 2 of node B satisfies the spectrum requirement of the service under the selected modulation mode 16QAM, and step B105 is executed.

At step B105, the front half segment of path segment 2 is output.

After step A102, it is determined that the front half segment of path segment 2 is successfully constructed. In this case, step A104 can be executed.

At step A104, process C is invoked to construct a rear half segment of path segment 2.

Specifically, invoking process C to construct a rear half segment of path segment 2 may include step C101 to step C106.

At step C101, a list of candidate OEPs [Oep1] of the rear half segment of path segment 2 is determined.

At step C102, it is determined whether an unselected OEP can be selected from the list of candidate OEPs. Here, an unselected OEP can be selected, and step C103 is executed.

At step C103, an unselected OEP is randomly selected from the list of candidate OEPs. Here, only Oep1 can be selected, and it is recorded as RearOep. It is determined whether RearOep supports the modulation mode of the front half segment of path segment 2. Here, RearOep can support the modulation mode 16QAM of the front half segment of path segment 2, and step C104 is executed.

At step C104, it is determined whether the rear half segment of path segment 2 can satisfy the spectrum requirement of the service. Here, an intersection set of available frequencies for Oep1 and port 1 of node C satisfies the spectrum requirement of the service under the selected modulation mode 16QAM, and step C105 is executed.

At step C105, it is determined whether the current path segment and a continuous through path segment prior to the current path segment can satisfy the spectrum requirement of the service. Here, an intersection set of available frequencies for Oep4 of node B, port 2 of node B, port 1 of node C, and OEP1 of node C satisfies the spectrum requirement of the service under the selected modulation mode 16QAM, and step C106 is executed.

At step C106, the rear half segment of path segment 2 is output.

After step A104, it is determined that the rear half segment of path segment 2 is successfully constructed. In this case, step A106 is executed.

At step A106, path segment 2 is formed and output.

After path segment 2 is successfully constructed, step 404 is executed.

At step 404, the value of segNo is increased by 1, and the process returns to step 402.

At step 402, it is determined that all the path segments on the service path have been constructed, and step 407 is executed.

At step 407, a frequency used by each path segment on the service path is allocated. That is, frequencies used by the service under the modulation mode QPSK are allocated from the intersection set of available frequencies for Oep4 of node A, port 2 of node A, port 1 of node B, and Oep1 of node B; and frequencies used by the service under the modulation mode 16QAM are allocated from the intersection set of available frequencies for Oep4 of node B, port 2 of node B, port 1 of node C, and Oep1 of node C.

Embodiment Five

For better illustration of the present disclosure, further examples will now be introduced on the basis of the foregoing embodiments of the present disclosure.

Based on the scenario shown in FIG. 8, this scenario represents a scenario where OEPs are used in nodes and backtracking occurs during a spectrum allocation process.

According to the disclosure in the foregoing embodiments, for the scenario shown in FIG. 8, another example spectrum allocation method for an optical network may include step 401 to step 407.

At step 401, an initial value of segNo is set to 1.

At step 402, it is determined whether all path segments on a service path have been constructed. Here, not all the path segments on the service path have been constructed. In this case, step 403 is executed.

At step 403, process A is invoked to construct a path segment with sequence number 1, namely, process A is invoked to construct path segment 1.

Specifically, invoking process A to construct path segment 1 may include step A101 to step A106.

At step A101, it is determined that a front half segment of path segment 1 has not been constructed, and step A102 is executed.

At step A102, process B is invoked to construct the front half segment of path segment 1.

Specifically, invoking process B to construct a front half segment of path segment 1 may include step B101 to step B 105.

At step B101, a list of candidate OEPs [Oep4] of the front half segment of path segment 1 is determined.

At step B102, it is determined that an unselected OEP can be randomly selected from the list of candidate OEPs, and step B103 is executed.

At step B103, an unselected OEP is randomly selected from the list of candidate OEPs. Here, only Oep4 can be selected, and the selected Oep4 is recorded as FrontOep. It is determined that an unselected modulation mode can be selected from modulation modes available for FrontOep, and step B104 is executed.

At step B104, an unselected modulation mode is selected from the modulation modes available for FrontOep. For example, a modulation mode QPSK can be selected here. It is determined whether the front half segment of the path segment can satisfy a spectrum requirement of the service. Here, an intersection set of frequencies for Oep4 and port 2 of node A satisfies the spectrum requirement of the service under the selected modulation mode QPSK.

At step B105, the front half segment of path segment 1 is output.

After step A102, it is determined that the front half segment of path segment 1 is successfully constructed. In this case, step A104 is executed.

At step A104, process C is invoked to construct a rear half segment of path segment 1.

Specifically, invoking process C to construct a rear half segment of path segment 1 may include step C101 to step C106.

At step C101, a list of candidate OEPs [through OEP1, Oep1] of the rear half segment of path segment 1 is determined. Here, through OEP1 indicates a through path that is directly available for the rear half segment of path segment 1.

At step C102, it is determined that an unselected OEP can be selected from the list of candidate OEPs. In this case, step C103 is executed.

At step C103, an unselected OEP is randomly selected from the list of candidate OEPs. Here, through OEP1 is preferably selected, and it is recorded as RearOep. The modulation mode of through OEP1 is forcibly changed to the modulation mode of the front half segment of path segment 1. It is determined whether RearOep supports the modulation mode of the front half segment of path segment 1. Here, RearOep supports the modulation mode of the front half segment of path segment 1, and step C104 is executed.

At step C104, it is determined whether the rear half segment of path segment 1 can satisfy the spectrum requirement of the service. Here, an intersection set of available frequencies for through OEP1 and port 1 of Node B satisfies the spectrum requirement of the service under the selected modulation mode QPSK. In this case, step C105 is executed.

At step C105, it is determined whether the current path segment and a continuous through path segment prior to the current path segment can satisfy the spectrum requirement of the service. Here, an intersection set of available frequencies for Oep4 of node A, port 2 of node A, port 1 of node B, and through OEP1 of node B satisfies the spectrum requirement of the service under the selected modulation mode QPSK. In this case, step C106 is executed.

At step C106, the rear half segment of path segment 1 is output.

After step A104, it is determined that the rear half segment of path segment 1 is successfully constructed. In this case, step A106 is executed.

At step A106, path segment 1 is formed and output.

After path segment 1 is successfully constructed, step 404 is executed.

At step 404, the value of segNo is increased by 1, and the process returns to step 402.

At step 402, it is determined whether all path segments on the service path have been constructed. Here, path segment 2 has not been constructed yet. In this case, step 403 is continuously executed.

At step 403, process A is invoked to construct a path segment with sequence number 2.

Specifically, invoking process A to construct a path segment with sequence number 2 may include step A101 to step A106.

At step A101, it is determined that a front half segment of path segment 2 has not been constructed, and step A102 is executed.

At step A102, process B is invoked to construct the front half segment of path segment 2.

Specifically, invoking process B to construct the front half segment of path segment 2 may include step B101 to step B105.

At step B101, a list of candidate OEPs [through OEP2] of the front half segment of path segment 2 is determined, because a through OEP is used for the rear half segment of path segment 1.

At step B102, it is determined whether an unselected OEP can be selected from the list of candidate OEPs. Here, an unselected OEP can be selected, and step B103 is executed.

At step B103, an unselected OEP is randomly selected from the list of candidate OEPs. Here, only through OEP2 can be selected, and it is recorded as FrontOep. The modulation mode of through OEP2 is forcibly changed to the modulation mode QPSK of the rear half segment of path segment 1. It is determined whether an unselected modulation mode can be selected from modulation modes available for FrontOep. Here, an unselected modulation mode can be selected, and step B104 is executed.

At step B104, an unselected modulation mode is randomly selected from the modulation modes available for FrontOep. Here, only the modulation mode QPSK can be selected. It is determined whether the front half segment of path segment 2 can satisfy the spectrum requirement of the service. Here, an intersection set of available frequencies for through OEP2 and port 2 of node B does not satisfy the spectrum requirement of the service under the selected modulation mode QPSK, and step B103 is executed.

Then, step B103 is executed. It is found that an unselected modulation mode cannot be selected from the modulation modes available for FrontOep, and the process returns to step B102. When step B102 is executed, it is determined that an unselected OEP can be selected from the list of candidate OEPs. Accordingly, it is determined that the construction of the front half segment of path segment 2 has failed, and thus it is determined that the construction of path segment 2 has failed.

After step 403, step 405 is executed after determining that the construction of path segment 2 has failed.

At step 405, it is determined whether segNo is equal to 0. Here, segNo is not equal to 0, and step 406 is executed.

At step 406, the value of segNo is decreased by 1, the process returns to step 402, and backtracking starts.

At step 402, it is determined whether all path segments on the service path have been constructed. Here, path segment1 and path segment 2 have not been successfully constructed yet. In this case, step 403 is continuously executed.

At step 403, process A is invoked to construct a path segment with sequence number 1.

Specifically, invoking process A to construct a path segment with sequence number 1 may include step A101 to step A106.

At step 101, it is determined that the front half segment of path segment 1 has been constructed, and step A104 is executed.

At step A104, process C is invoked to construct a rear half segment of path segment 1.

Specifically, invoking process C to construct a rear half segment of path segment 1 may include step C101 to step C106.

At step C101, a list of candidate OEPs [through OEP1, Oep1] of the rear half segment of path segment 1 is determined. Here, through OEP1 indicates a through path that is directly available for the rear half segment of path segment 1.

At step C102, it is determined that an unselected OEP can be selected from the list of candidate OEPs. In this case, step C103 is executed.

At step C103, an unselected OEP is randomly selected from the list of candidate OEPs. Here, only through Oep1 can be selected, and it is recorded as RearOep. It is determined whether RearOep supports the modulation mode of the front half segment of path segment 1. Here, RearOep supports the modulation mode of the front half segment of path segment 1, and step C104 is executed.

At step C104, it is determined whether the rear half segment of path segment 1 can satisfy the spectrum requirement of the service. Here, an intersection set of available frequencies for through OEP1 and port 1 of Node B satisfies the spectrum requirement of the service under the selected modulation mode. In this case, step C105 may be executed.

At step C105, it is determined whether the current path segment and a continuous through path segment prior to the current path segment can satisfy the spectrum requirement of the service. Here, an intersection set of available frequencies for Oep4 of node A, port 2 of node A, port 1 of node B, and OEP1 of node B satisfies the spectrum requirement of the service under the selected modulation mode QPSK. In this case, step C106 is executed.

At step C106, the rear half segment of path segment 1 is output.

After step A104, it is determined that the rear half segment of path segment 1 is successfully constructed. In this case, step A106 is executed.

At step A106, path segment 1 is formed and output.

After path segment 1 is successfully constructed, step 404 is executed.

At step 404, the value of segNo is increased by 1, and the process returns to step 402.

At step 402, it is determined whether all path segments on the service path have been constructed. Here, path segment 2 has not been constructed yet. In this case, step 403 is continuously executed.

At step 403, process A is invoked to construct a path segment with sequence number 2.

Specifically, invoking process A to construct a path segment with sequence number 2 may include step A101 to step A106.

At step A101, it is determined that a front half segment of path segment 2 has not been constructed, and step A102 is executed.

At step A102, process B is invoked to construct the front half segment of path segment 2.

Specifically, invoking process B to construct the front half segment of path segment 2 may include step B101 to step B105.

At step B101, a list of candidate OEPs [OEP4] of the front half segment of path segment 2 is determined, because OEP4 is located on the same electrical cross-connection subrack as Oep1 that is used for the rear half segment of path segment 1.

At step B102, it is determined whether an unselected OEP can be selected from the list of candidate OEPs. Here, an unselected OEP can be selected, and step B103 is executed.

At step B103, an unselected OEP is selected from the list of candidate OEPs. Here, only Oep4 can be selected, and it is recorded as FrontOep. It is determined whether an unselected modulation mode can be selected from modulation modes available for FrontOep. Here, an unselected modulation mode can be selected, and step B104 is executed.

At step B104, an unselected modulation mode is randomly selected from the modulation modes available for FrontOep. Here, a modulation mode 16QAM can be selected. It is determined whether the front half segment of path segment 2 can satisfy the spectrum requirement of the service. Here, an intersection set of available frequencies for Oep4 and port 2 of node B satisfies the spectrum requirement of the service under the selected modulation mode 16QAM, and step B105 is executed.

At step B105, the front half segment of path segment 2 is output.

After step A102, it is determined that the front half segment of path segment 2 is successfully constructed. In this case, step A104 can be executed.

At step A104, process C is invoked to construct a rear half segment of path segment 2.

Specifically, invoking process C to construct a rear half segment of path segment 2 may include step C101 to step C106.

At step C101, a list of candidate OEPs [Oep1] of the rear half segment of path segment 2 is determined.

At step C102, it is determined whether an unselected OEP can be selected from the list of candidate OEPs. Here, an unselected OEP can be selected, and step C103 is executed.

At step C103, an unselected OEP is randomly selected from the list of candidate OEPs. Here, only Oep1 can be selected, and it is recorded as RearOep. It is determined whether RearOep supports the modulation mode of the front half segment of path segment 2. Here, RearOep can support the modulation mode of the front half segment of path segment 2, and step C104 is executed.

At step C104, it is determined whether the rear half segment of path segment 2 can satisfy the spectrum requirement of the service. Here, an intersection set of available frequencies for Oep1 and port 1 of node C satisfies the spectrum requirement of the service under the selected modulation mode 16QAM, and step C105 is executed.

At step C105, it is determined whether the current path segment and a continuous through path segment prior to the current path segment can satisfy the spectrum requirement of the service. Here, an intersection set of available frequencies for Oep4 of node B, port 2 of node B, port 1 of node C, and Oep1 of node C satisfies the spectrum requirement of the service under the selected modulation mode 16QAM.

At step C106, the rear half segment of path segment 2 is output.

After step A104, it is determined that the rear half segment of path segment 2 is successfully constructed. In this case, step A106 is executed.

At step A106, path segment 2 is formed and output.

After path segment 2 is successfully constructed, step 404 is executed.

At step 404, the value of segNo is increased by 1, and the process returns to step 402.

At step 402, it is determined that all the path segments on the service path have been constructed, and step 407 is executed.

At step 407, a frequency used by each path segment on the service path is allocated. That is, frequencies used by the service under the modulation mode QPSK are allocated from the intersection set of available frequencies for Oep4 of node A, port 2 of node A, port 1 of node B, and Oep1 of node B; and frequencies used by the service under the modulation mode 16QAM are allocated from the intersection set of available frequencies for Oep4 of node B, port 2 of node B, port 1 of node C, and Oep1 of node C.

Embodiment Six

On the basis of the spectrum allocation methods for an optical network proposed in the foregoing embodiments, Embodiment Six of the present disclosure provides a spectrum allocation device for an optical network and a computer storage medium.

Specifically, computer program instructions corresponding to a spectrum allocation method for an optical network in this embodiment can be stored on storage media such as optical disks, hard disks, and USB flash drives. When read or executed by an electronic device, the computer program instructions corresponding to a spectrum allocation method for an optical network implement the steps of any one of the spectrum allocation methods for an optical network according to the foregoing embodiments.

Figure 10:
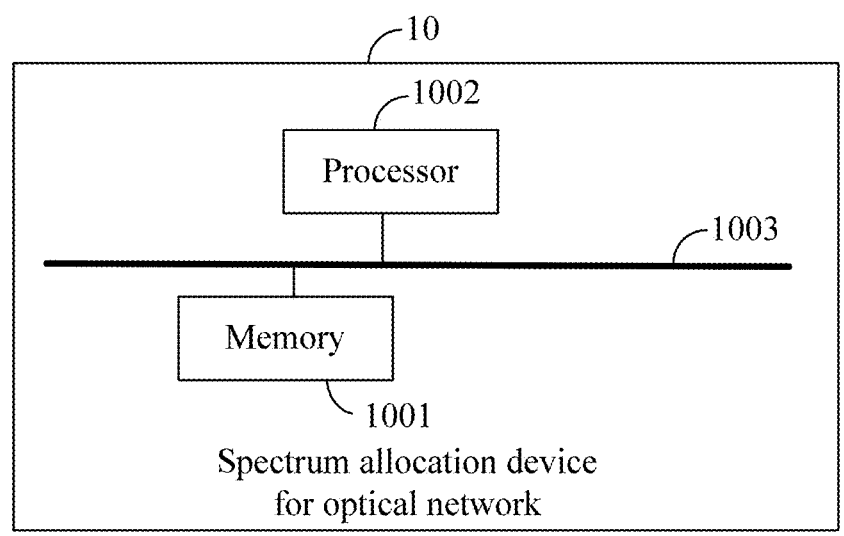
FIG. 10 is a schematic diagram of a structure of a spectrum allocation device for an optical network according to an embodiment of the present disclosure.

Based on the same technical concept of the foregoing embodiments, FIG. 10 shows a spectrum allocation device 10 for an optical network provided in an embodiment of the present disclosure. The device may include a memory 1001, a processor 1002, and a bus 1003.

The bus 1003 is configured to connect the memory 1001 and the processor 1002 and for mutual communication between these means.

The memory 1001 is configured to store computer programs and data.

The processor 1002 is configured to execute the computer programs stored in the memory to implement the steps of any one of the spectrum allocation methods for an optical network according to the foregoing embodiments.

In practical applications, the aforementioned memory 1001 may be a volatile memory (such as RAM), or a non-volatile memory (such as ROM, flash memory, hard disk drive (HDD), or solid-state drive (SSD)), or a combination of the types of memories described above, and may provide instructions and data to the processor 1002.

The aforementioned processor 1002 may be at least one of an application specific integrated circuit (ASIC), a DSP, a digital signal processing device (DSPD), a programmable logic device (PLD), a FPGA, a CPU, a controller, a microcontroller, and a microprocessor. It can be understood that, for different devices, the electronic devices used to implement the foregoing processor functions may also be other devices, and are not specifically limited in this embodiment of the present disclosure.

Those skilled in the art should understand that the embodiments of the present disclosure may be provided as methods, systems, or computer program products. Therefore, the present disclosure may adopt the form of a hardware embodiment, a software embodiment, or an embodiment combining software and hardware. Moreover, the present disclosure can be in the form of a computer program product implemented on one or more computer-usable storage media (including but not limited to disk storage, optical storage, etc.) containing computer-usable program codes.

The present disclosure is described with reference to flowcharts and/or block diagrams of methods, devices (systems), and computer program products according to embodiments of the present disclosure. It should be understood that each process and/or block in the flowcharts and/or block diagrams, and the combination of processes and/or blocks in the flowcharts and/or block diagrams can be implemented by computer program instructions. These computer program instructions can be provided to the processor of a general-purpose computer, a special-purpose computer, an embedded processor, or other programmable data processing devices to generate a machine, so that the instructions executed by the processor of the computer or other programmable data processing devices generate means for implementing the functions specified in one or more processes in the flowcharts and/or one or more blocks in the block diagrams.

These computer program instructions can also be stored in a computer-readable memory that can guide a computer or other programmable data processing devices to work in a specific manner, so that the instructions stored in the computer-readable memory produce an article of manufacture including instructing means. The instructing means implements the functions specified in one or more processes in the flowcharts and/or one or more blocks in the block diagrams.

These computer program instructions can also be loaded on a computer or other programmable data processing devices, so that a series of operation steps are executed on the computer or other programmable devices to produce computer-implemented processing. Thus, the instructions executed on the computer or other programmable devices provide steps for implementing the functions specified in one or more processes in the flowcharts and/or one or more blocks in the block diagrams.

The foregoing descriptions are intended to illustrate specific embodiments of the present disclosure, but not to limit the scope of the present disclosure.

What is claimed is:

1. A spectrum allocation method for an optical network, wherein the method comprises steps of:

segmenting a service path of an optical network to obtain at least one path segment, a front half segment and a rear half segment of each path segment being respectively located at two adjacent nodes of the service path;

trying to allocate, in sequence, for each path segment of the service path a service processing manner that satisfies a service spectrum requirement in an order of path segments of the service path from front to rear, wherein allocating, when i is in a range of 1 to P, P indicating the number of path segments of the service path, and when a service processing manner that satisfies a service spectrum requirement is present in unallocated service processing manners for an $i^{th}$ path segment of the service path, the service processing manner that satisfies the service spectrum requirement, which is from the unallocated service processing manners for the $i^{th}$ path segment, for the $i^{th}$ path segment, wherein allocating, when a service processing manner that satisfies a service spectrum requirement has been allocated to a front half segment of the $i^{th}$ path segment, a service processing manner, which is from unallocated service processing manners for a rear half segment of the $i^{th}$ path segment, for the rear half segment of the $i^{th}$ path segment and allocating, when no service processing manner that satisfies a service spectrum requirement has been allocated to the front half segment of the $i^{th}$ path segment, or when a service processing manner that satisfies a service spectrum requirement has been allocated to the front half segment of the $i^{th}$ path segment and no service processing manner that satisfies a service spectrum requirement is present in unallocated service processing manners for the rear half segment of the $i^{th}$ path segment, a service processing manner for the front half segment of the $i^{th}$ path segment; and allocating, when a currently allocated service processing manner of each path segment of the service path satisfies the service spectrum requirement, a frequency used by each path segment on the service path according to the currently allocated service processing manner of each path segment of the service path.

2. The method according to claim 1, wherein the step of allocating a service processing manner for the front half segment of the $i^{th}$ path segment comprises steps of:

allocating, when a service processing manner that satisfies a service spectrum requirement is present in unallocated service processing manners for the front half segment of the $i^{th}$ path segment, a service processing manner that satisfies a service spectrum requirement, which is from the unallocated service processing manners for the front half segment of the $i^{th}$ path segment, for the front half segment of the $i^{th}$ path segment; and determining, when no service processing manner that satisfies a service spectrum requirement is present in unallocated service processing manners for the front half segment of the $i^{th}$ path segment, that no service processing manner that satisfies a service spectrum requirement is present in unallocated service processing manners for the $i^{th}$ path segment.

3. The method according to claim 1, wherein the step of allocating a service processing manner for the rear half segment of the $i^{th}$ path segment comprises a step of:

allocating, when a service processing manner that satisfies a service spectrum requirement is present in unallocated service processing manners for the rear half segment of the $i^{th}$ path segment, a service processing manner that satisfies a service spectrum requirement, which is from the unallocated service processing manners for the rear half segment of the $i^{th}$ path segment, for the rear half segment of the $i^{th}$ path segment.

4. The method according to claim 1, wherein the step of allocating a service processing manner for the front half segment of the $i^{th}$ path segment comprises steps of:

allocating, when an internal path selected at a $j^{th}$ time from internal paths that can be used by the front half segment of the $i^{th}$ path segment can satisfy a spectrum requirement of a service under any selected modulation mode, a following service processing manner for the front half segment of the $i^{th}$ path segment: a service processing manner obtained based on the internal path selected at the $j^{th}$ time and a corresponding selected modulation mode, j being an integer greater than or equal to 1, the selected modulation mode being a modulation mode that can be used by the internal path selected at the $j^{th}$ time; and performing, when j is less than n and when the internal path selected at the $j^{th}$ time cannot satisfy a spectrum requirement of a service under any selected modulation mode, selecting an internal path again from internal paths that can be used by the front half segment of the $i^{th}$ path segment and have not been selected; and determining, when j is equal to n and when the internal path selected at the $j^{th}$ time cannot satisfy a spectrum requirement of a service under any selected modulation mode, that no service processing manner that satisfies a service spectrum requirement is present in unallocated service processing manners for the front half segment of the $i^{th}$ path segment, n indicating the number of the internal paths that can be used by the front half segment of the $i^{th}$ path segment.

5. The method according to claim 4, wherein the method further comprises a step of: selecting an OEP that satisfies a first set condition from a list of candidate optical and electric processors, called OEPs, of the front half segment of the $i^{th}$ path segment, wherein the list of candidate OEPs of the front half segment of the $i^{th}$ path segment comprises at least one physical OEP and one virtual OEP which is used for indicating a through path that does not use a physical OEP; and correspondingly, the internal paths that can be used by the front half segment of the $i^{th}$ path segment are paths constructed based on a selected OEP that satisfies the first set condition, wherein, the first set condition comprises:

a candidate OEP and a router half-hop port form a connection;

when the $i^{th}$ path segment is a first path segment of the service path, the candidate OEP is located at a service access electrical cross-connection subrack; and when the $i^{th}$ path segment is not the first path segment of the service path and an OEP of the rear half segment of the $(i-1)^{th}$ path segment is a virtual OEP, the candidate OEP is a virtual OEP; and when the $i^{th}$ path segment is not the first path segment of the service path and the OEP of the rear half segment of the $(i-1)^t$ path segment is not a virtual OEP, the candidate OEP and the OEP used by the rear half segment of the $(i-1)^t$ path segment are located at a same electrical cross-connection subrack.

6. The method according to claim 1, wherein the step of allocating a service processing manner for the rear half segment of the $i^{th}$ path segment comprises steps of:
  allocating, when an internal path selected at a kth time from internal paths that can be used by the rear half segment of the $i^{th}$ path segment can satisfy a spectrum requirement of a service under a specific modulation mode and the $i^{th}$ path segment and a continuous through path segment prior to the $i^{th}$ path segment satisfy the spectrum requirement of the service under the specific modulation mode, a following service processing manner for the rear half segment of the $i^{th}$ path segment: a service processing manner obtained based on the internal path selected at the kth time and the specific modulation mode, wherein k is an integer greater than or equal to 1; the specific modulation mode is a modulation mode in a currently allocated service processing manner for the front half segment of the $i^{th}$ path segment; and the through path segment indicates a path segment that satisfies a following condition: an internal path used by a rear half segment of the path segment is a through path;
  performing, when k is less than m, if the internal path selected at the kth time does not support the specific modulation mode, or the internal path selected at the kth time cannot satisfy the spectrum requirement of the service under the specific modulation mode, or the $i^{th}$ path segment and the continuous through path segment prior to the $i^{th}$ path segment do not satisfy the spectrum requirement of the service under the specific modulation mode, selecting an internal path again from internal paths that can be used by the rear half segment of the $i^{th}$ path segment and have not been selected; and
  determining, when k is equal to n, if the internal path selected at the kth time does not support the specific modulation mode, or the internal path selected at the kth time cannot satisfy the spectrum requirement of the service under the specific modulation mode, or the $i^{th}$ path segment and the continuous through path segment prior to the $i^{th}$ path segment do not satisfy the spectrum requirement of the service under the specific modulation mode, that no service processing manner that satisfies a service spectrum requirement is present in unallocated service processing manners for the rear half segment of the $i^{th}$ path segment, m indicating the number of the internal paths that can be used by the rear half segment of the $i^{th}$ path segment.

7. The method according to claim 6, wherein the method further comprises a step of: selecting an OEP that satisfies a second set condition from a list of candidate OEPs of the rear half segment of the $i^{th}$ path segment, wherein the list of candidate OEPs of the rear half segment of the $i^{th}$ path segment comprises at least one physical OEP and one virtual OEP which is used for indicating a through path that does not use a physical OEP; and
  correspondingly, the internal paths that can be used by the rear half segment of the $i^{th}$ path segment are paths constructed based on a selected OEP that satisfies the second set condition,
  wherein, the second set condition comprises:
  a candidate OEP and a router half-hop port form a connection; and
  when the $i^{th}$ path segment is a last path segment of the service path, the candidate OEP is located at a service access electrical cross-connection subrack.

8. The method according to claim 7, wherein when k is in a range of 1 to m and a through path is present in internal paths that can be used by the rear half segment of the $i^{th}$ path segment and have not been selected, the internal path selected at the kth time is a through path.

9. The method according to claim 1, wherein when it is tried to allocate a service processing manner that satisfies a service spectrum requirement for any path segment, which is not a first path segment, on the service path, the method further comprises steps of:
  trying to reallocate, when no service processing manner that satisfies a service spectrum requirement is present in unallocated service processing manners for the any path segment, a service processing manner that satisfies a service spectrum requirement, which is from unallocated service processing manners for a specific path segment, for the specific path segment, the specific path segment being a path segment prior to the any path segment; and
  trying to allocate, when reallocating a service processing manner that satisfies a service spectrum requirement is performed for the specific path segment, in sequence, a service processing manner that satisfies a service spectrum requirement for each of path segments following the specific path segment in an order of path segments of the service path from front to rear.

10. The method according to claim 9, wherein the method further comprises a step of:
  determining, when i is in a range of 2 to P, P indicating the number of path segments of the service path, and when no service processing manner that satisfies a service spectrum requirement is present in unallocated service processing manners for the $i^{th}$ path segment of the service path, that no service processing manner that satisfies a service spectrum requirement can be allocated for the $i^{th}$ path segment.

11. The method according to claim 1, wherein the method further comprises a step of: determining, when i is equal to 1 and when it is determined that no service processing manner that satisfies a service spectrum requirement is present in unallocated service processing manners for the $i^{th}$ path segment of the service path that a process of performing spectrum allocation for an optical network fails.

12. The method according to claim 1, wherein the step of allocating a frequency used by each path segment on the service path according to the currently allocated service processing manner of each path segment of the service path comprises steps of:
  obtaining a range of an optional frequency for a currently allocated service processing manner of each path segment of the service path; and
  allocating a frequency used by each path segment on the service path from an intersection set of respective ranges of the optional frequency.

13. A spectrum allocation device for an optical network, wherein the device comprises a processor and a memory configured to store computer programs that are executable by the processor, wherein the processor is configured to execute the computer programs to implement a spectrum allocation method for an optical network, which comprises steps of:
  segmenting a service path of an optical network to obtain at least one path segment, a front half segment and a rear half segment of each path segment being respectively located at two adjacent nodes of the service path;
  trying to allocate, in sequence, for each path segment of the service path a service processing manner that satisfies a service spectrum requirement in an order of path segments of the service path from front to rear, wherein allocating, when i is in a range of 1 to P, P indicating the number of path segments of the service path, and when a service processing manner that satisfies a service spectrum requirement is present in unallocated service processing manners for an $i^{th}$ path segment of the service path, the service processing manner that satisfies the service spectrum requirement, which is from the unallocated service processing manners for the $i^{th}$ path segment, for the $i^{th}$ path segment, wherein allocating, when a service processing manner that satisfies a service spectrum requirement has been allocated to a front half segment of the $i^{th}$ path segment, a service processing manner, which is from unallocated service processing manners for a rear half segment of the $i^{th}$ path segment, for the rear half segment of the $i^{th}$ path segment and allocating, when no service processing manner that satisfies a service spectrum requirement has been allocated to the front half segment of the $i^{th}$ path segment, or when a service processing manner that satisfies a service spectrum requirement has been allocated to the front half segment of the $i^{th}$ path segment and no service processing manner that satisfies a service spectrum requirement is present in unallocated service processing manners for the rear half segment of the $i^{th}$ path segment, a service processing manner for the front half segment of the $i^{th}$ path segment; and allocating, when a currently allocated service processing manner of each path segment of the service path satisfies the service spectrum requirement, a frequency used by each path segment on the service path according to the currently allocated service processing manner of each path segment of the service path.

14. A computer storage medium, which stores computer programs thereon, wherein the computer programs, when executed by a processor, implement a spectrum allocation method for an optical network, which comprises steps of:

segmenting a service path of an optical network to obtain at least one path segment, a front half segment and a rear half segment of each path segment being respectively located at two adjacent nodes of the service path;

trying to allocate, in sequence, for each path segment of the service path a service processing manner that satisfies a service spectrum requirement in an order of path segments of the service path from front to rear, wherein allocating, when i is in a range of 1 to P, P indicating the number of path segments of the service path, and when a service processing manner that satisfies a service spectrum requirement is present in unallocated service processing manners for an $i^{th}$ path segment of the service path, the service processing manner that satisfies the service spectrum requirement, which is from the unallocated service processing manners for the $i^{th}$ path segment, for the $i^{th}$ path segment, wherein allocating, when a service processing manner that satisfies a service spectrum requirement has been allocated to a front half segment of the $i^{th}$ path segment, a service processing manner, which is from unallocated service processing manners for a rear half segment of the $i^{th}$ path segment, for the rear half segment of the $i^{th}$ path segment and allocating, when no service processing manner that satisfies a service spectrum requirement has been allocated to the front half segment of the $i^{th}$ path segment, or when a service processing manner that satisfies a service spectrum requirement has been allocated to the front half segment of the $i^{th}$ path segment and no service processing manner that satisfies a service spectrum requirement is present in unallocated service processing manners for the rear half segment of the $i^{th}$ path segment, a service processing manner for the front half segment of the $i^{th}$ path segment; and allocating, when a currently allocated service processing manner of each path segment of the service path satisfies the service spectrum requirement, a frequency used by each path segment on the service path according to the currently allocated service processing manner of each path segment of the service path.

\* \* \* \* \*